(12) United States Patent
Douady et al.

(10) Patent No.: US 8,634,004 B2
(45) Date of Patent: Jan. 21, 2014

(54) MONITORING OF OPTICAL DEFECTS IN AN IMAGE CAPTURE SYSTEM

(75) Inventors: Cesar Douady, Orsay (FR); Frederic Guichard, Paris (FR); Imene Tarchouna, Paris (FR)

(73) Assignee: DXO Labs, Billancourt (FR)

( * ) Notice: Subject to any disclaimer, the term of this patent is extended or adjusted under 35 U.S.C. 154(b) by 215 days.

(21) Appl. No.: 13/144,293

(22) PCT Filed: Jan. 11, 2010

(86) PCT No.: PCT/FR2010/050034
§ 371 (c)(1),
(2), (4) Date: Jul. 13, 2011

(87) PCT Pub. No.: WO2010/081982
PCT Pub. Date: Jul. 22, 2010

(65) Prior Publication Data
US 2011/0273569 A1    Nov. 10, 2011

(30) Foreign Application Priority Data
Jan. 14, 2009   (FR) ...................................... 09 50192

(51) Int. Cl.
*H04N 9/64* (2006.01)
*H04N 17/02* (2006.01)

(52) U.S. Cl.
USPC ........................................ 348/251; 348/187

(58) Field of Classification Search
USPC .................................. 348/187, 188, 246, 251
See application file for complete search history.

(56) References Cited

U.S. PATENT DOCUMENTS

| 7,032,472 B2 * | 4/2006 | Mikrut ........................ 74/380 |
| 7,071,966 B2 * | 7/2006 | Lu et al. ...................... 348/188 |
| 7,352,403 B2 * | 4/2008 | Liao et al. ................... 348/187 |
| 7,907,185 B2 * | 3/2011 | Huggett ....................... 348/335 |
| 7,961,973 B2 * | 6/2011 | Hung .......................... 348/222.1 |

(Continued)

FOREIGN PATENT DOCUMENTS

| JP | 2001186409 A * | 7/2001 |
| WO | WO0079784 | 12/2000 |
| WO | WO03043308 | 5/2003 |
| WO | WO2007055179 | 5/2007 |

OTHER PUBLICATIONS

International Search Report in Application No. PCT/FR2010/050034.

*Primary Examiner* — John Villecco
(74) *Attorney, Agent, or Firm* — Dean W. Russell; Renae Bailey Wainwright; Kilpatrick Townsend & Stockton LLP

(57) ABSTRACT

Method of monitoring an image capture system (1) comprising a sensor (C) comprising a plurality of photosensitive elements ($Z_1$, $Z_2$, $Z_n$) and an optical device (L) for focusing the light emitted from a scene towards the sensor. This method comprises the obtaining (100) of respective responses of certain at least of the photosensitive elements ($E_1$, $E_1'$, $P_1$, $P_2$) of the sensor to an exposure of the image capture system to any scene (S), followed by a determination (200) of at least one deviation (Δ) between at least one quantity (G) deduced from the responses obtained and at least one reference quantity (Gref). These steps may be followed by an estimation (300) of an optical effect of the image capture system (1) on the basis of said deviation (Δ) determined and optionally by an implementation of an action able to at least partially compensate (400) for the estimated optical defect.

15 Claims, 19 Drawing Sheets

(56) References Cited

U.S. PATENT DOCUMENTS

Figure 1A:
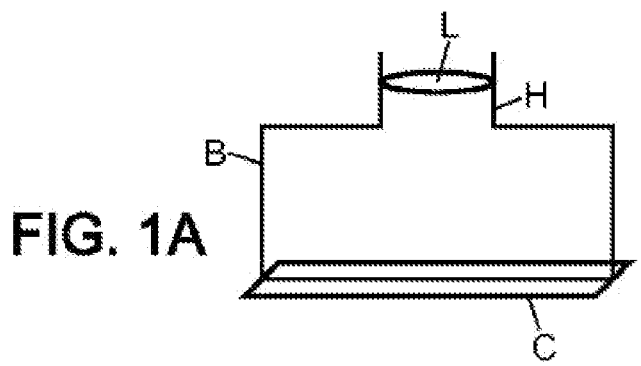

| | | | |
|---|---|---|---|
| 8,049,795 B2* | 11/2011 | Noh | 348/335 |
| 8,054,350 B2* | 11/2011 | Kyung | 348/251 |
| 8,085,391 B2* | 12/2011 | Machida et al. | 356/124 |
| 8,106,976 B2* | 1/2012 | Kawasaka | 348/335 |
| 8,164,633 B2* | 4/2012 | Panahpour Tehrani et al. | 348/187 |
| 8,339,463 B2* | 12/2012 | Wang et al. | 348/187 |
| 8,405,711 B2* | 3/2013 | Wang et al. | 348/187 |
| 2006/0125945 A1* | 6/2006 | Suzuki | 348/311 |
| 2007/0133893 A1* | 6/2007 | Jerdev | 382/254 |
| 2007/0165119 A1 | 7/2007 | Ikeda | |
| 2008/0111912 A1* | 5/2008 | Chen | 348/335 |
| 2008/0218607 A1 | 9/2008 | Shoji et al. | |
| 2009/0219419 A1 | 9/2009 | Kawasaka | |
| 2011/0001848 A1* | 1/2011 | Nguyen | 348/241 |
| 2011/0074961 A1* | 3/2011 | Lee | 348/187 |
| 2011/0141292 A1* | 6/2011 | Wu et al. | 348/187 |
| 2011/0310254 A1* | 12/2011 | Barnes et al. | 348/187 |
| 2012/0081583 A1* | 4/2012 | Kikuchi et al. | 348/242 |
| 2012/0293670 A1* | 11/2012 | Chan et al. | 348/208.4 |
| 2013/0050537 A1* | 2/2013 | Hsu | 348/241 |

* cited by examiner

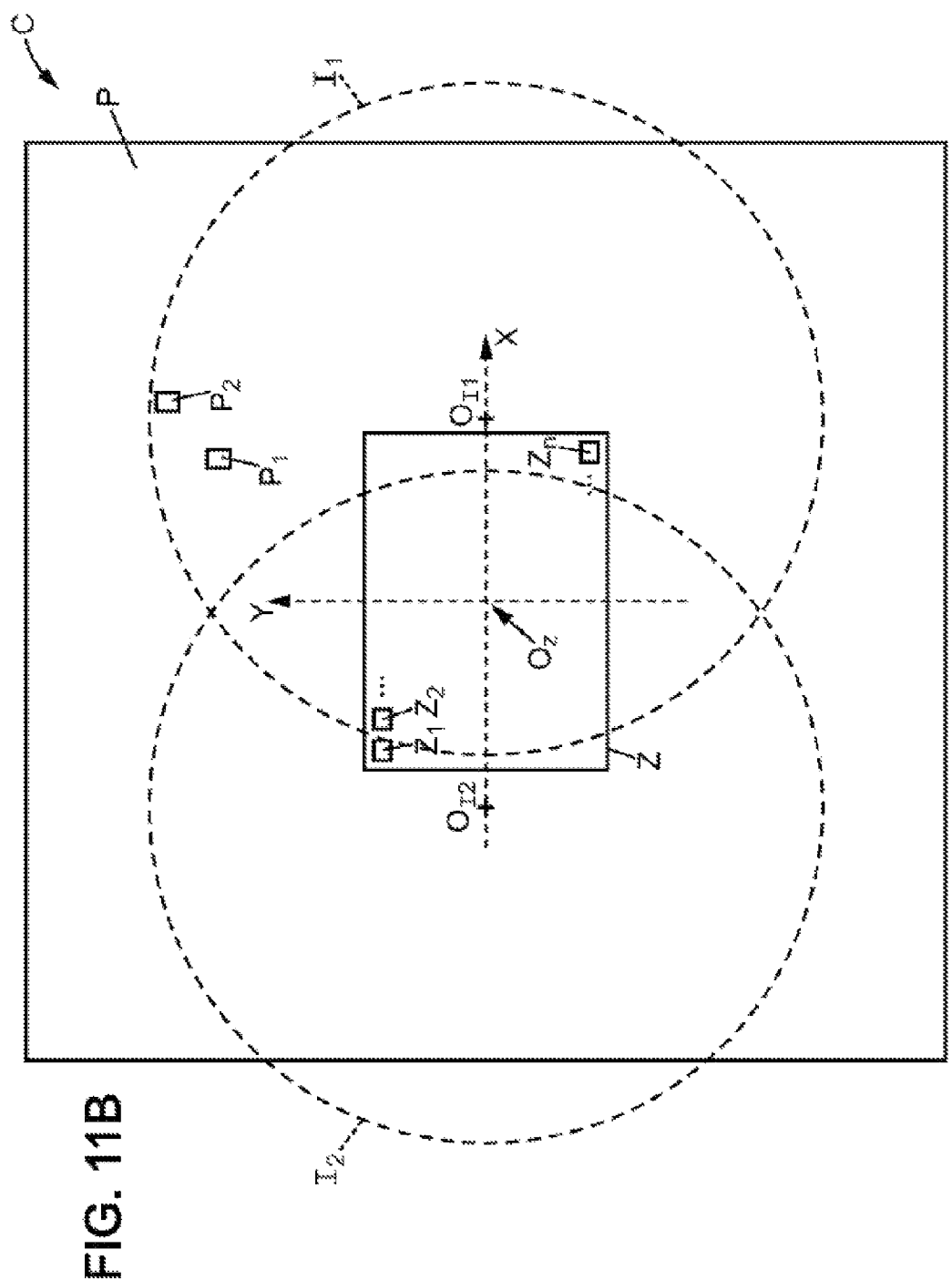

MONITORING OF OPTICAL DEFECTS IN AN IMAGE CAPTURE SYSTEM

CROSS REFERENCE TO RELATED APPLICATIONS

This application is the U.S. national phase of International Application No. PCT/FR2010/050034 filed on Jan. 11, 2010, which application claims priority to French Patent Application No. 0950192 filed on Jan. 14, 2009, the contents of both of which are incorporated herein by reference.

This invention relates to the field of digital image capture systems.

Such an image capture system (still or animated images) may, for example, be a module suitable for use in a digital camera, a reflex camera, a scanner, a fax, an endoscope, a movie camera, a camcorder, a surveillance camera, a toy, a camera integrated or connected to a telephone or a personal digital assistant or a computer, a thermal camera, an ultrasonography system, an MRI (magnetic resonance imaging) device, an x-ray radiography device, etc.

Such a system conventionally comprises a sensor including a plurality of photosensitive elements (for example pixels) which convert a quantity of received light into digital values, and an optical device comprising one or more lenses for focusing the light on the sensor. These two elements together are commonly referred to as an "optical sensor module".

The sensor may, for example, be a CCD (charge-coupled device), CMOS (Complementary Metal-Oxide Semiconductor), CID (Charge Injection Device), IRCCD (Infrared CCD), ICCD (Intensified CCD), EBCCD (Electron Bombarded CCD), MIS (Metal Insulator Semiconductor), APS (Active Pixel Sensor), QWIP (Quantum Well Infrared Photodetector), MQW (Multi-Quantum Well), or other device. It may possibly be associated with a Bayer filter in order to obtain a color image.

During the production of an image capture system, a lens assembly step is necessary for each optical sensor module, in which the sensor is positioned relative to its associated optical device. Ideally, these two elements must be centered relative to each other and be in parallel planes, to enable the module to provide the best possible rendering of the image. In reality, the sensor and the optical device may not be optimally positioned during this assembly step.

Figure 1B:
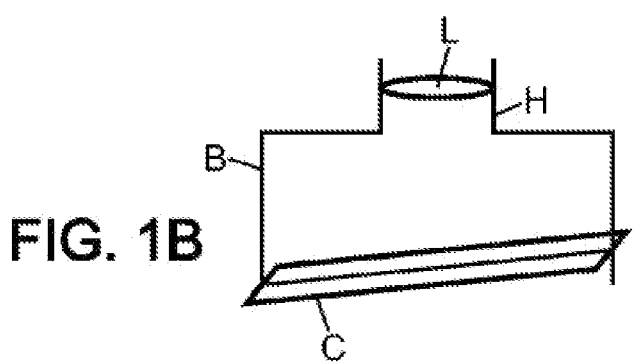
Figure 1C:
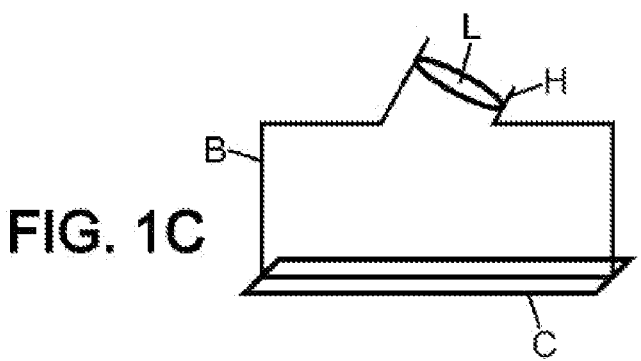

FIGS. 1A-1C show examples of a first positioning defect due to a tilt defect in an optical sensor module.

The optical sensor module presented in these figures comprises an optical device L and a sensor C as indicated above. A housing B receives the sensor C and has a lens support H (commonly referred to as the Holder) which serves to position the optical device L relative to the housing B, by a screw thread for example.

In the case in FIG. 1A, the different elements of the optical sensor module are correctly assembled. In other words, the sensor C and the optical device L are parallel to each other, which represents proper lens assembly.

The example in FIG. 1B illustrates a first example of a defect in the relative tilt between a sensor C and an optical device L. Here one can see that the sensor C is assembled at an angle in the housing B of the module. This causes an asymmetrical change in the clarity of the image provided by the sensor C. This is referred to as sensor tilt.

The example in FIG. 1C illustrates another example of a defect in the relative angle between a sensor C and an optical device L. Here, it is the optical holder H which is angled, which results in the non-parallelism of the optical device and the sensor C. Such a defect in the verticality of the optical holder H can be called holder tilt. This also causes an asymmetrical change in the clarity of the image provided by the sensor C.

Note that these two types of tilt defects may appear separately or together. The direct result of such relative tilt consists of a phenomenon of asymmetrical blurring in the image. This constitutes a lens defect and processed needs to be applied in order to obtain a sharp image. The image evolves from blurred to sharp in the direction of the tilt defect. Here for example we have a tilt defect in the horizontal axis of the sensor, with the lens angled towards the right of this axis. The blurring is said to be asymmetrical because the distance between the sensor and the lens is different on the right and on the left, corresponding to a variable focus for the image. Here, the right portion of the provided image will be sharp while the left portion of the image will be blurred.

Another type of defect that an optical-sensor module may have is a relative decentering defect, illustrated by FIGS. 2A-2D.

Figure 2A:
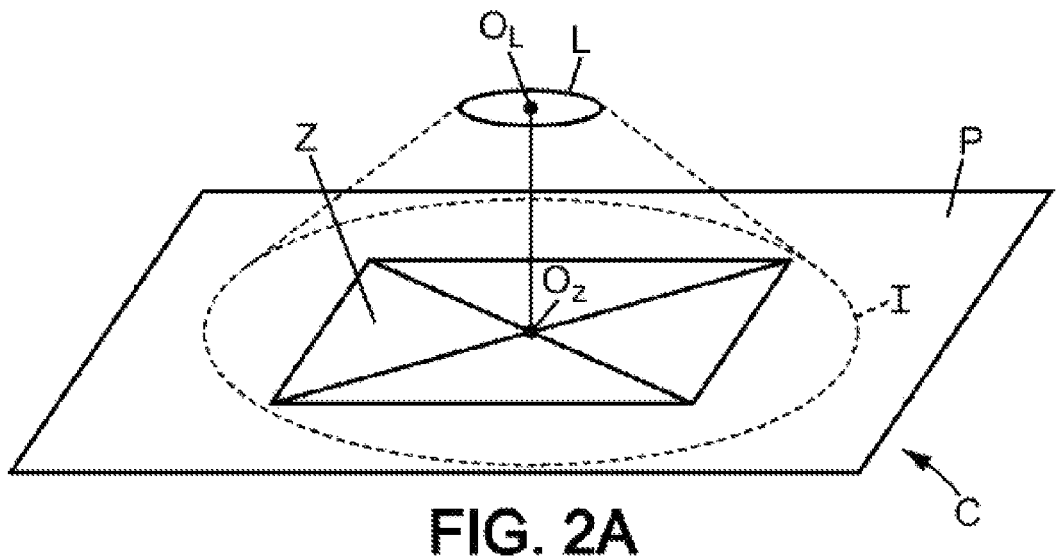

FIG. 2A shows the optical sensor module of an image capture system, comprising a circular optical device L having a center $O_L$, projecting the light it receives onto a sensor C in a circular lighting area I centered around $O_L$. The present sensor C has a central region Z comprising a certain number of pixels dedicated to capturing images, surrounded by a peripheral region P. In this FIG. 2A, the optical device L is perfectly centered with this central region Z, meaning that the center $O_Z$ of the central region Z, situated at the intersection of its diagonals, is aligned with the center $O_L$ of the illuminated region I, which ensures optimal illumination of the central region Z and therefore a certain uniformity in the brightness at the center of the image, as illustrated by FIG. 2B.

Figure 2B:
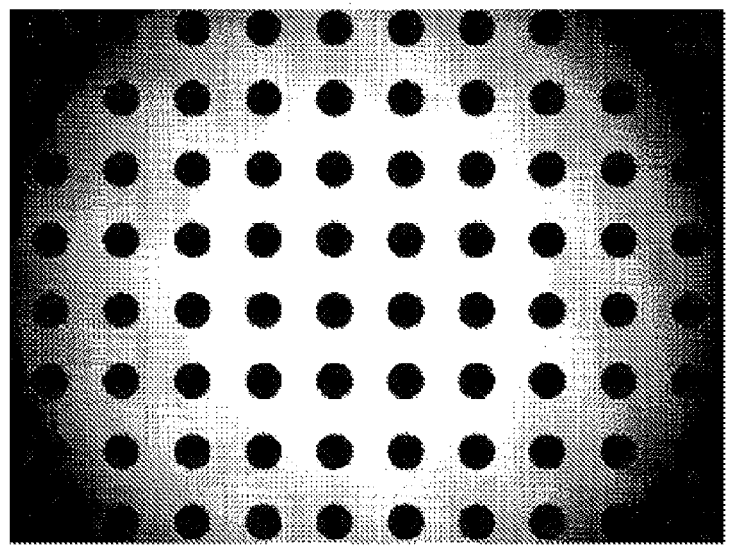

FIG. 2B shows a reference image, consisting of a series of regularly spaced points, as received by an optical sensor module according to FIG. 2A. Such an image shows a vignetting effect at its edges, which are less bright at the periphery of the illuminated region of the sensor. In addition, a "colored" vignetting effect may also appear at the edges of the image, due to vignetting as defined above but dependant on the color plane, which results in the appearance of certain colors in certain regions at the edge of the image. In the case of the module in FIG. 2A, the vignetting is centered and therefore only concerns the photosensitive elements situated at the edges of the image. Such vignetting can be corrected by digital processing applied after the optical sensor module.

Figure 2C:
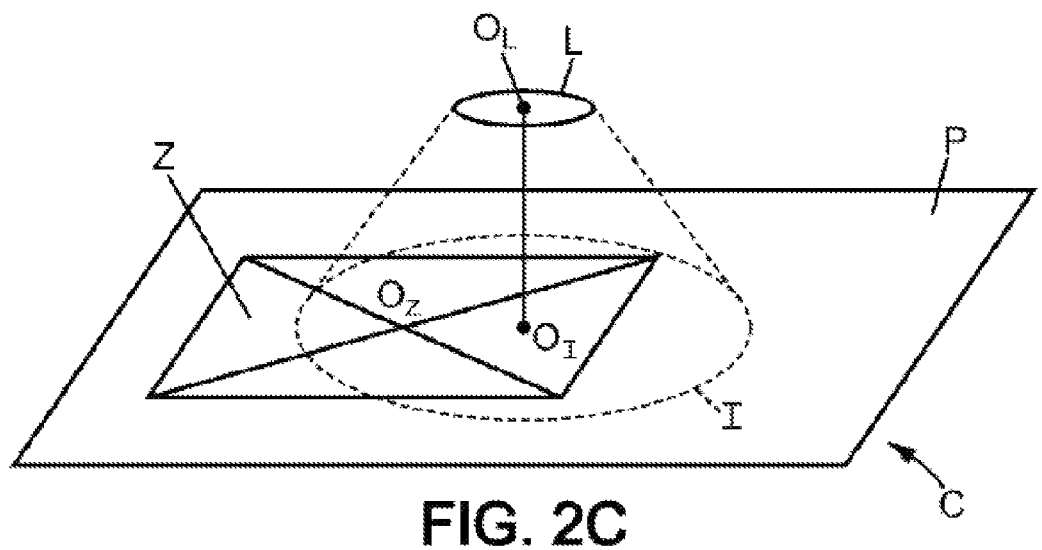
Figure 2D:
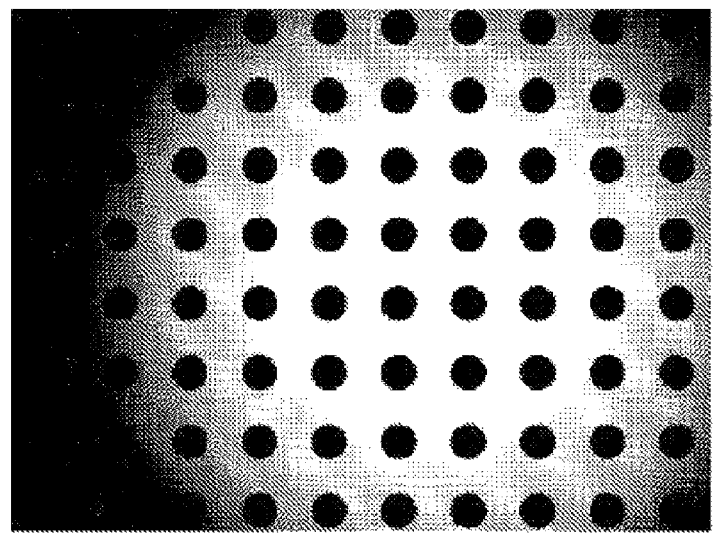

FIG. 2C shows the same optical sensor module, but here the optical device L is decentered relative to the central region Z of the sensor C. Here, the right portion of the central region Z is found at the center of the illuminated region I and will therefore receive much more light than the left portion of the central region Z which will receive much lower levels of light, or possibly no light if the decentering is too great. FIG. 2D illustrates the consequences of such decentering on a reference image identical to the one used in FIG. 2B, but this time received by the decentered optical sensor module in FIG. 2C. This vignetting, because it is decentered towards the right, constitutes an optical defect which can no longer be corrected with the same digital processing for correcting the centered vignetting illustrated in FIG. 2A.

In practice, optical sensor modules may be produced that have an offset from the center $O_L$ of the optical device relative to the center $O_Z$ of the active region Z of the sensor of up to 200 μm, which can have a significant negative impact on the vignetting correction.

Figure 3A:
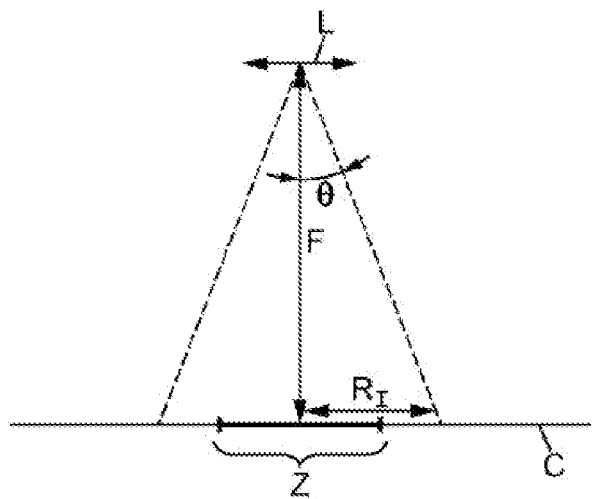
Figure 3B:
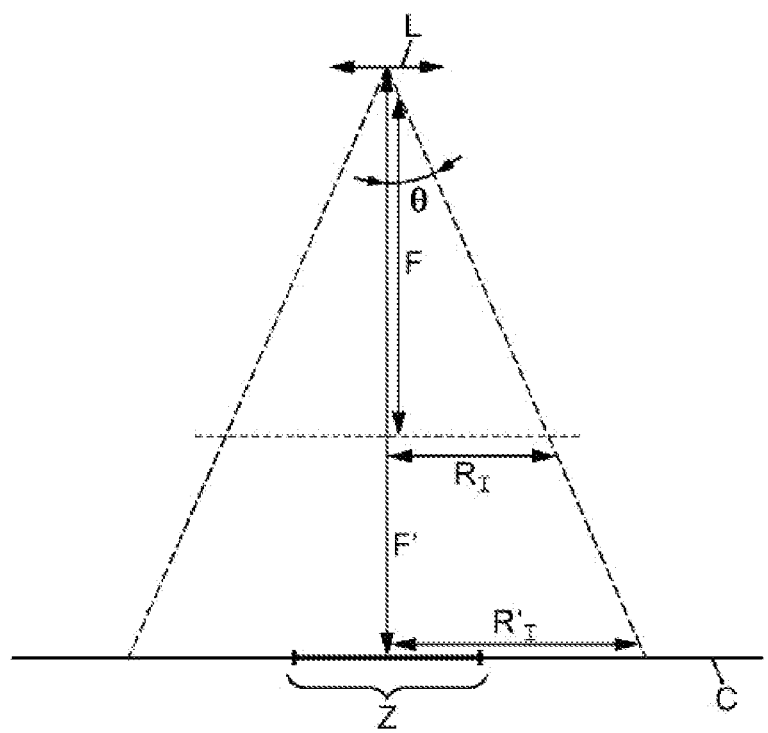

In addition, an optical sensor module may present a defocus defect in the lens relative to the sensor. This is another type of lens defect and is illustrated in FIGS. 3A and 3B. For the image focus to be optimal, as is the case in FIG. 3A, the sensor C and the optical device L of a module must be separated by a certain distance F, typically a distance which allows focusing the image on the sensor C. The circle of illumination I then has a radius $R_f$.

However, if the holder is poorly attached, if the internal threading of the holder is damaged, or due to temperature variations or other issues, the distance F' separating these two elements may be different from the optimal distance F, as illustrated in FIG. 3B. This is referred to as a defocus defect, which results in an out-of-focus image at the sensor C. In the example in FIG. 3B, this also results in an enlargement of the circle of illumination which now has a radius $R_f'$.

All the optical defects presented above cause a degradation in the quality of the image. The step of assembling the lens in a module is therefore usually followed by a characterization step for the assembled module, in which it is determined whether the quality of the assembly is sufficiently acceptable.

When an assembly is judged to be unacceptable, the module in question may be discarded, which can involve a large loss in productivity.

One alternative consists of correcting the assembly itself, by mechanically readjusting the relative positions of these different components. This solution is extremely costly, and is often difficult to implement.

The solution generally adopted consists of characterizing one or more optical defects of an optical sensor module, and correcting the effect by digital processing when this is possible.

This solution is usually applied by submitting a reference scene, a test pattern for example, to the optical sensor module in order to observe the obtained image that is output from this module. The reference scene and the shooting parameters are specifically chosen to test certain properties of the module. They can differ according to the defect to be characterized, which makes the validation step long and costly.

Once the image is captured, the defect characterization can be done in several ways. A measurement can be made in the image. Or the image captured by the module to be characterized can be compared to a reference image representing the same scene taken under the same conditions.

This characterization step allows the detection of unusable modules, for example by using a quality criterion applicable to the image that is output from the module. It also allows categorizing the modules by the quality of their optical assembly. In addition, it allows correcting the effect of a positioning defect of each module by an individual calibration of the image processing chain associated with the corresponding module. This is referred to as unit calibration.

Such a unit calibration solution, performed for each optical sensor module during the production phase, is extremely costly in terms of both time and money if one considers the large volumes of optical sensor modules to be produced for the consumer market.

In addition, if the optical sensor module suffers an impact after it is assembled in some type of device, for example when the device is dropped as is frequently the case with digital cameras, the relative positioning of the sensor and the optical device will be out of alignment, which will cause a degradation in the quality of the photographs.

One goal of the invention is to offer an image capture system not requiring a calibration step as described above, but which can self-calibrate. The self-calibration of such a system can be useful in the production chain, but also after assembly and outside the assembly plant, particularly after an impact, with no need for external intervention.

For this purpose, the invention proposes a method for monitoring an image capture system comprising a sensor comprising a plurality of photosensitive elements and an optical device for focusing the light emitted from a scene towards the sensor, with said method comprising a step of obtaining respective responses from at least some of the photosensitive elements of the sensor to an exposure of the image capture system to any scene, followed by a step of determining at least one deviation between at least one quantity deduced from the responses obtained and at least one reference quantity.

This exposure of the image capture system to any particular scene allows eliminating the initial calibration of the prior art, which requires the acquisition under controlled conditions and the analysis of a reference scene, such as a test pattern. It also allows verifying the image capture system at any time and place.

It also proposes a control method comprising, in addition to the steps described in the above paragraph, a step of estimating an optical defect of the image capture system based on said determined deviation. A step of implementing an action able to at least partially compensate for the estimated optical defect can also be implemented. The estimation of the optical defect and/or its compensation can be implemented by the image capture system itself, by a means situated downstream from this system (for example by a third party which is supplied with said determined deviation or estimation of the optical defect), or in a manner that is shared by the image capture system and the means situated downstream from this system.

In a preferred embodiment, the obtained responses comprise the responses of photosensitive elements sensitive to at least one common spectral band. This allows the use of responses that are relatively homogeneous spectrally, without needing to apply equalization processing specific to each spectral band. One can thus indirectly detect a tilt defect between the sensor and its associated optical device.

Preferably, the obtained responses comprise the responses of photosensitive elements sensitive to at least the green spectral band. This allows using any type of scene to detect a defect in the optical sensor module, in addition to offering a more sensitive response.

Advantageously, the quantity deduced from the obtained responses comprises a mathematical comparison between at least some of the obtained responses. Such a mathematical comparison allows eliminating components of the response related to the image content itself, and more distinctly highlights the component related to the defect to be detected.

Preferably, at least some of the photosensitive elements for which the respective responses are obtained are first- or second-nearest neighbors in the sensor. With such proximity, the observed image area is highly homogeneous, which will eliminate from the components the response related to image content, no matter what the content is.

Advantageously, the obtained responses comprise the responses from a plurality of pairs of photosensitive elements for which is determined, for each of said pair of photosensitive elements, a deviation between a quantity deduced from the responses of the photosensitive elements which are part of said pair and a reference quantity. In this manner a general deviation is obtained which is less sensitive to local transitions within a particular region of the image to be captured.

Preferably, this plurality of pairs of photosensitive elements is positioned in a selected region of the sensor. Thus a region of the sensor receiving a portion of the image not subject to a high number of variations can be chosen, which will yield a more reliable defect determination.

In another preferred embodiment of the invention, the obtained responses comprise the responses from photosensitive elements situated at the periphery of the sensor. Such a configuration allows, for example, detecting a decentering defect, or obtaining information on the defocus state of the lens.

Advantageously, the sensor comprises a central image capture region and a peripheral region not involved in the image capture, and said photosensitive elements situated at the periphery of the sensor belong to said peripheral region. This allow detecting an optical positioning defect before it has an impact on the central region of the sensor.

Preferably, the obtained responses comprise the responses from at least two photosensitive elements positioned on a first axis passing through the central image capture region, on each side of this central region. This will allow providing an indication of the direction and orientation of the decentering.

Advantageously, the obtained responses additionally comprise the responses from at least two photosensitive elements positioned on a second axis passing through the central image capture region and substantially orthogonal to the first axis, one on each side of the central image capture region. This can be used to characterize an optical defect such as decentering in the two dimensions of the sensor.

Preferably, the obtained responses comprise the responses from at least a first plurality of photosensitive elements positioned on a first axis passing through the central image capture region and part of a first secondary region of the sensor, separated from each other by a determined distance, and a second plurality of photosensitive elements positioned on a second axis passing through the central image capture region and substantially orthogonal to said first axis, being part of a second secondary region of the sensor distinct from said first secondary region and separated from each other by a determined distance. This provides a quantification of an optical defect such as decentering in the two dimensions of the sensor, which allows a more precise compensation to be made if any or a return to an exact case where compensation can be made if any.

The invention also relates to an image capture system comprising means for implementing the above method. The image capture system comprises:
- a sensor comprising a plurality of photosensitive elements,
- an optical device for focusing the light emitted from a scene on the sensor,
- a means for determining at least one deviation between at least one quantity deduced from respective responses from at least some of the photosensitive elements of the sensor to an exposure of the image capture system to any scene, and at least one reference quantity.

Advantageously, this system additionally comprises a means of estimating an optical defect in the image capture system based on said determined deviation, and possibly also a means of at least partially compensating for the estimated optical defect.

The invention also relates to a digital camera comprising an image capture system as above.

Figure 4:
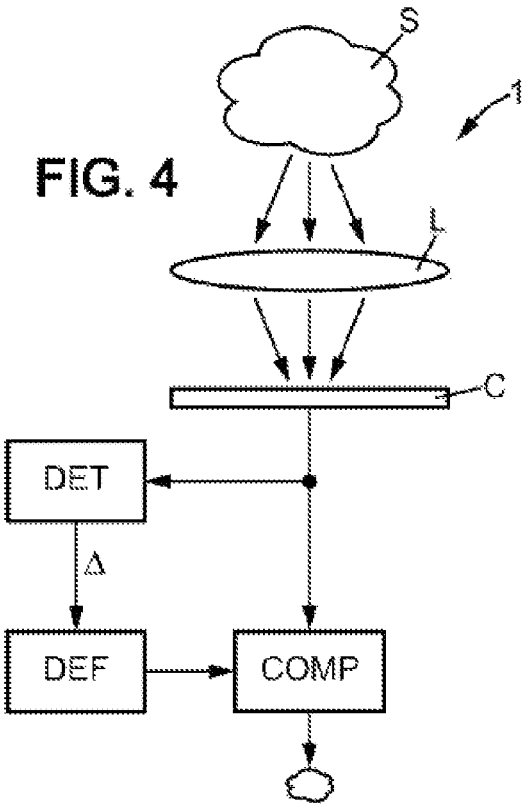
Figure 5:
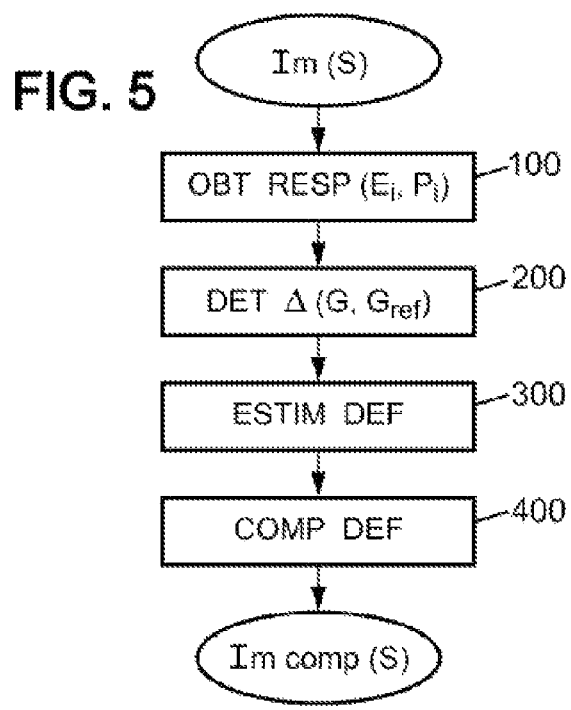
Figure 6A:
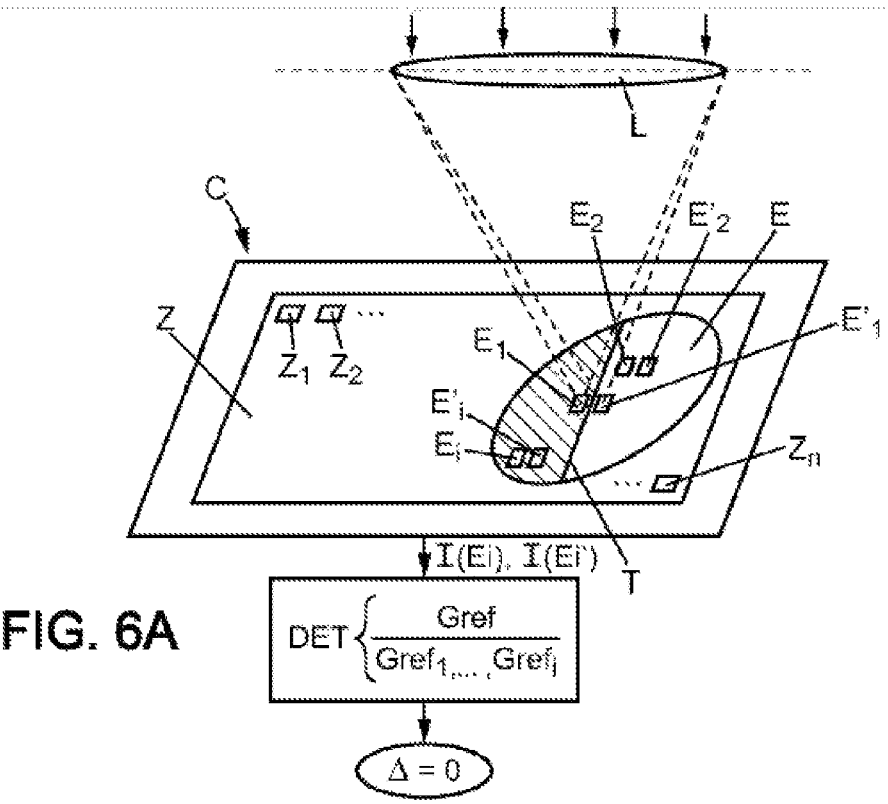
Figure 6B:
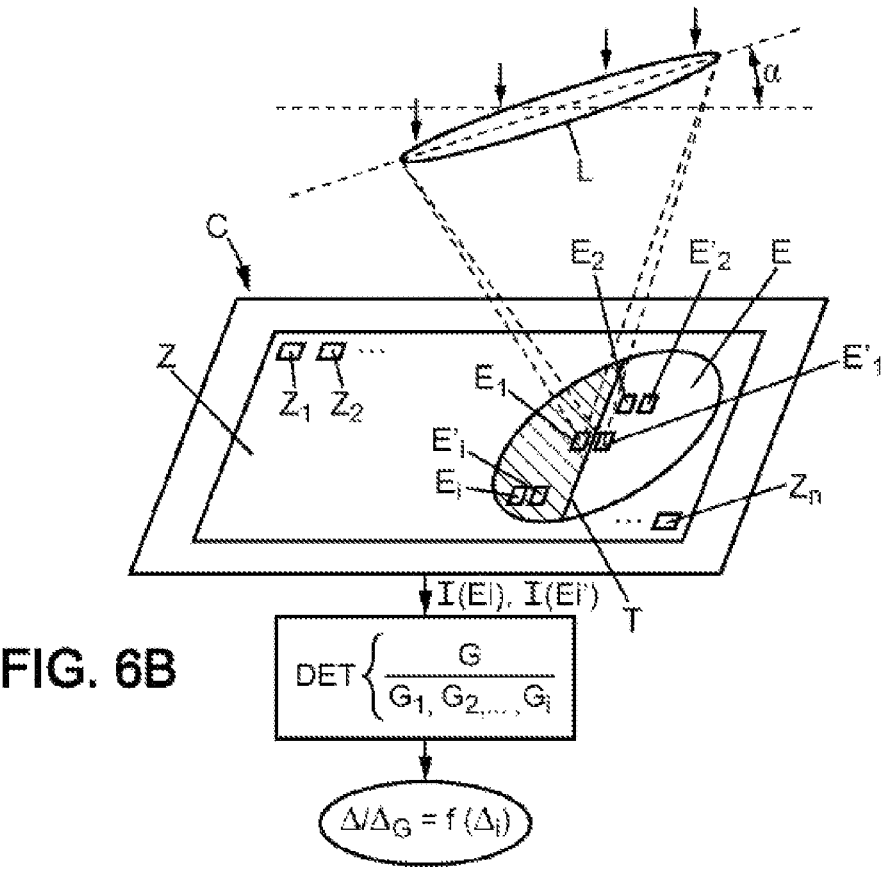
Figure 7:
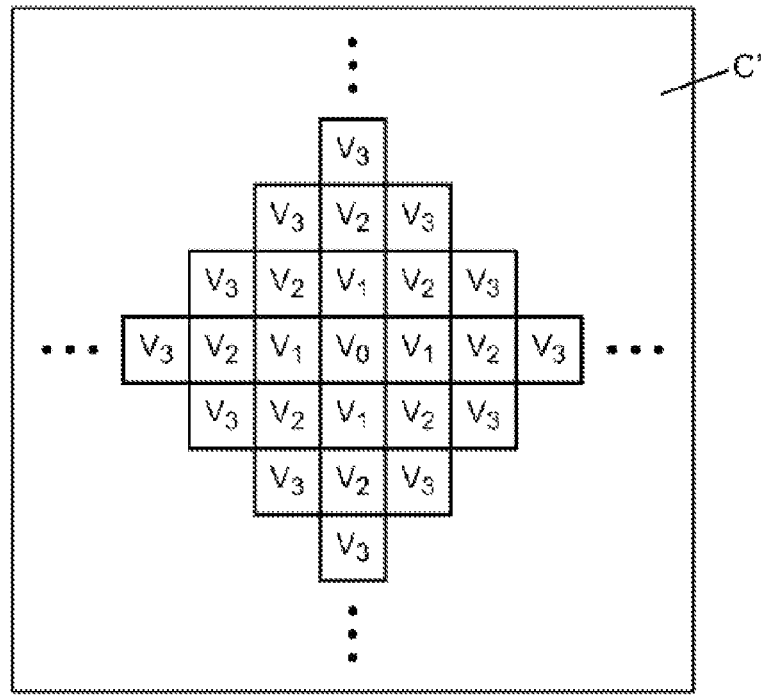
Figure 9:
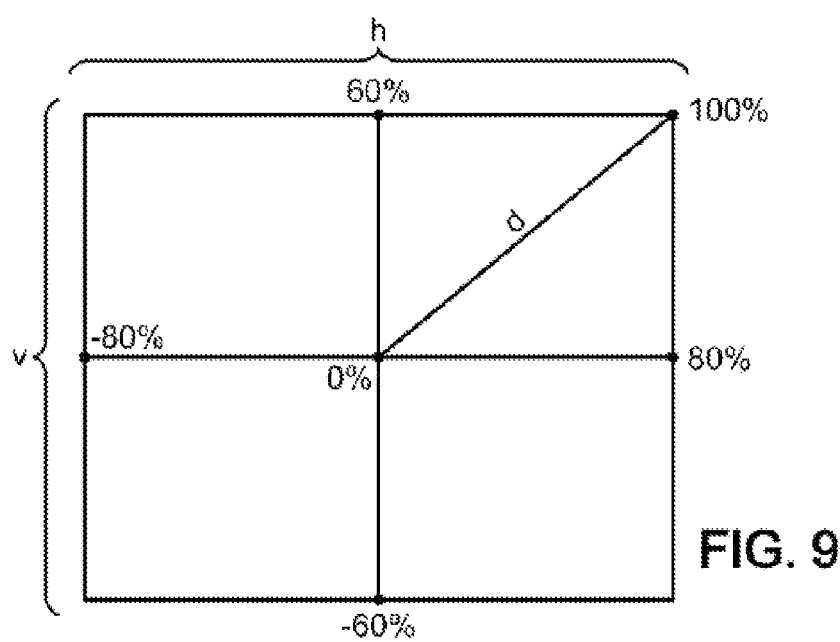
Figure 8:
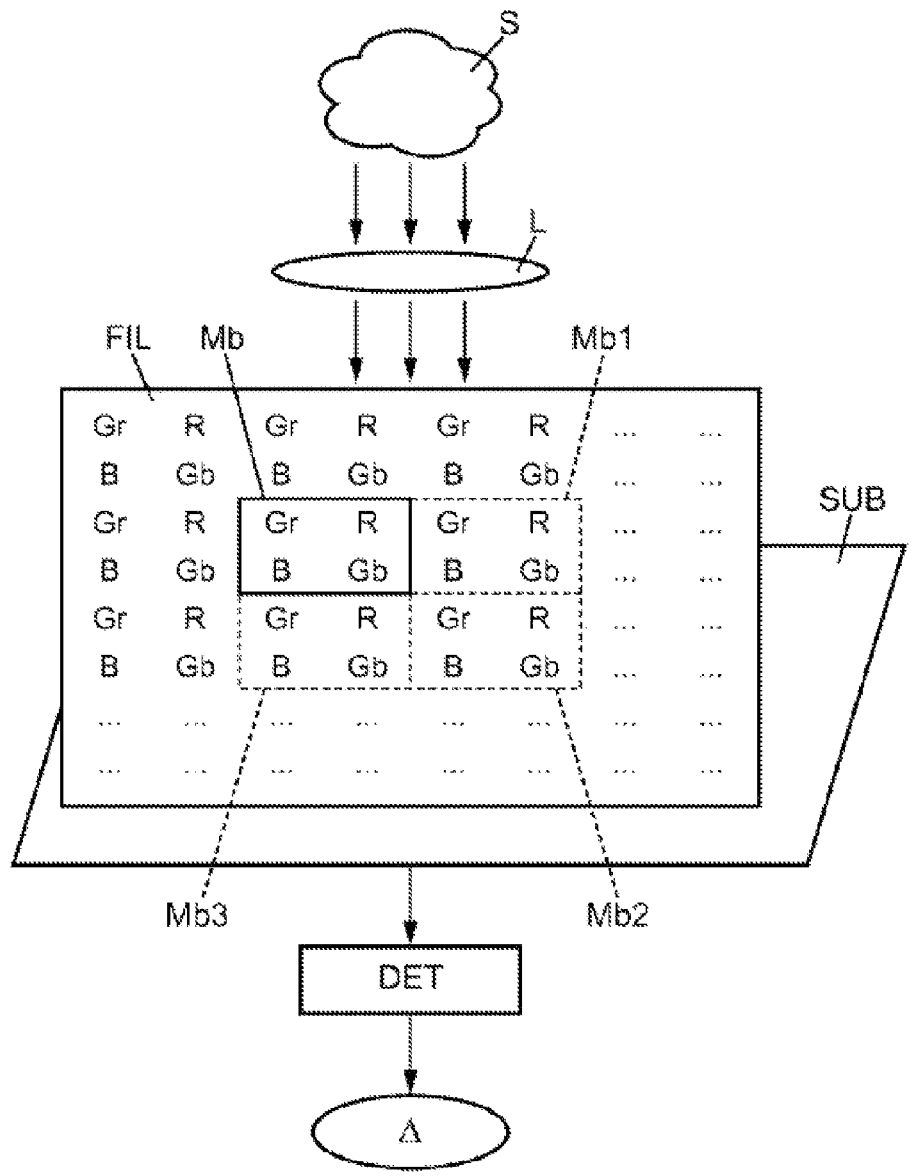
Figure 10A:
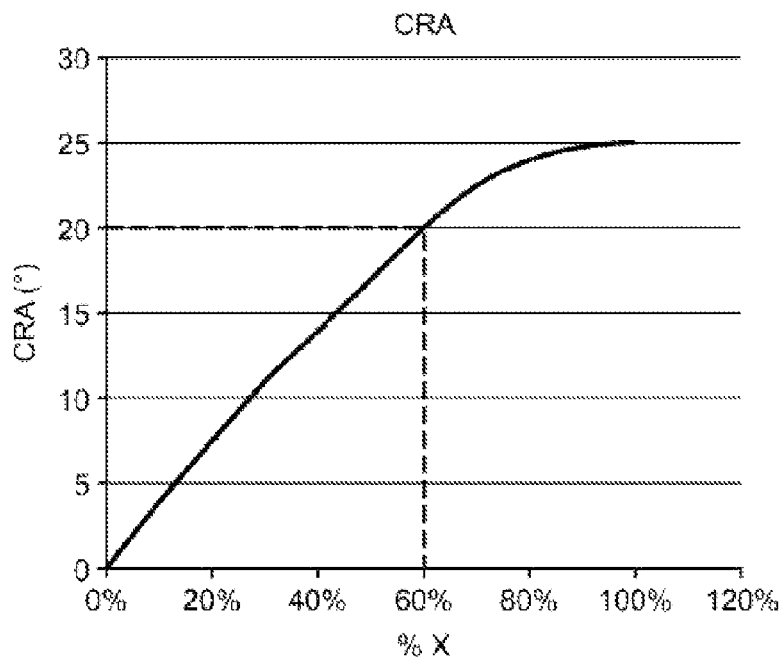
Figure 10B:
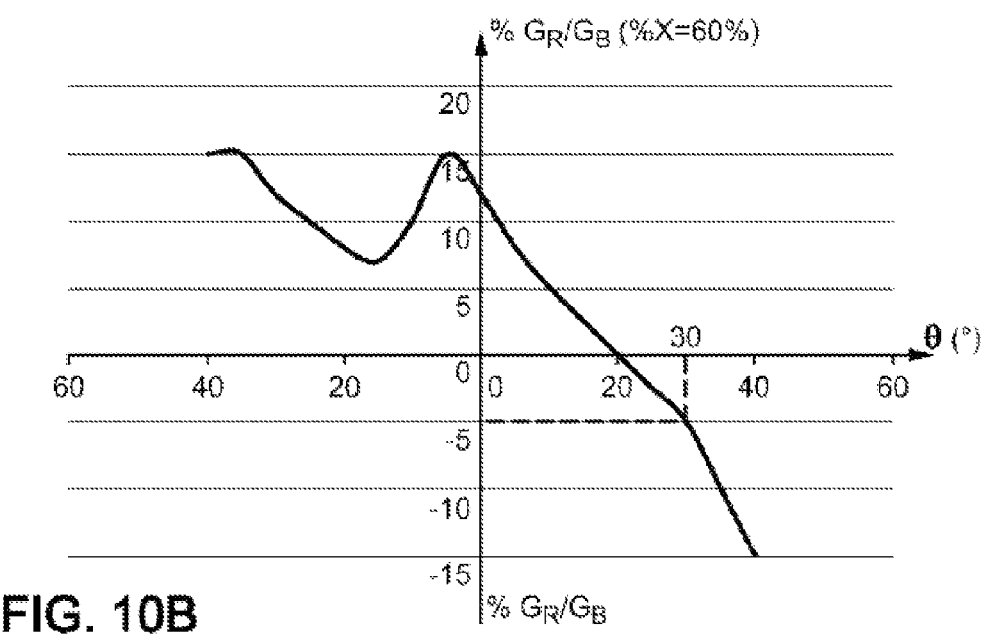
Figure 10C:
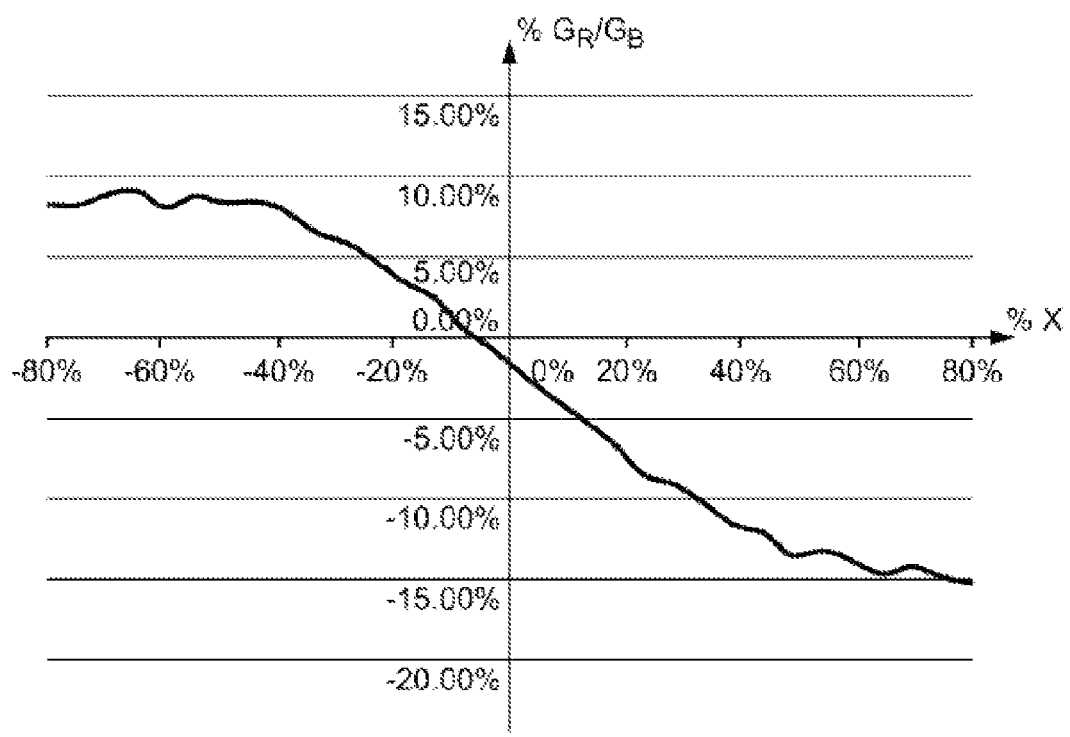
Figure 11A:
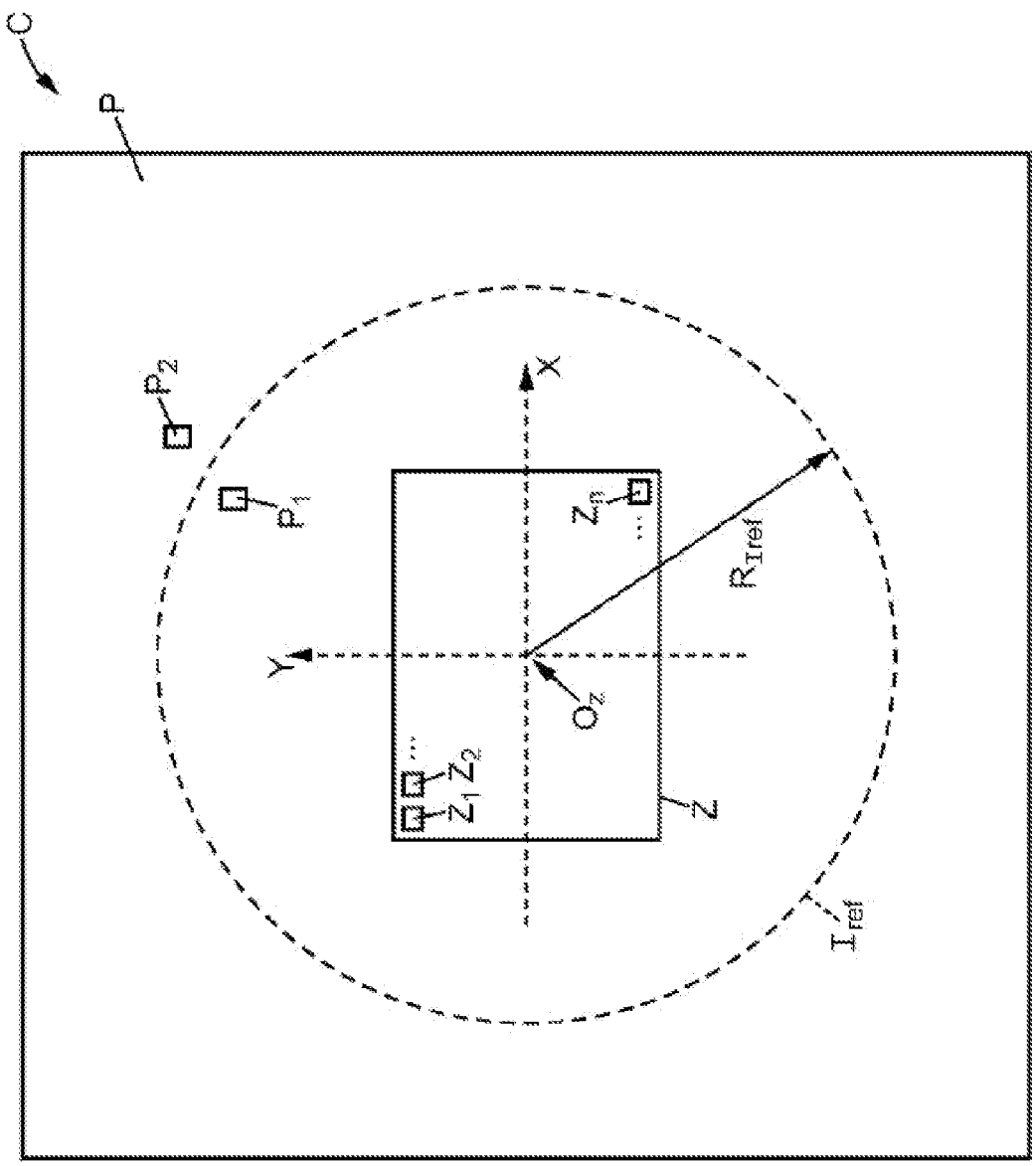
Figure 11C:
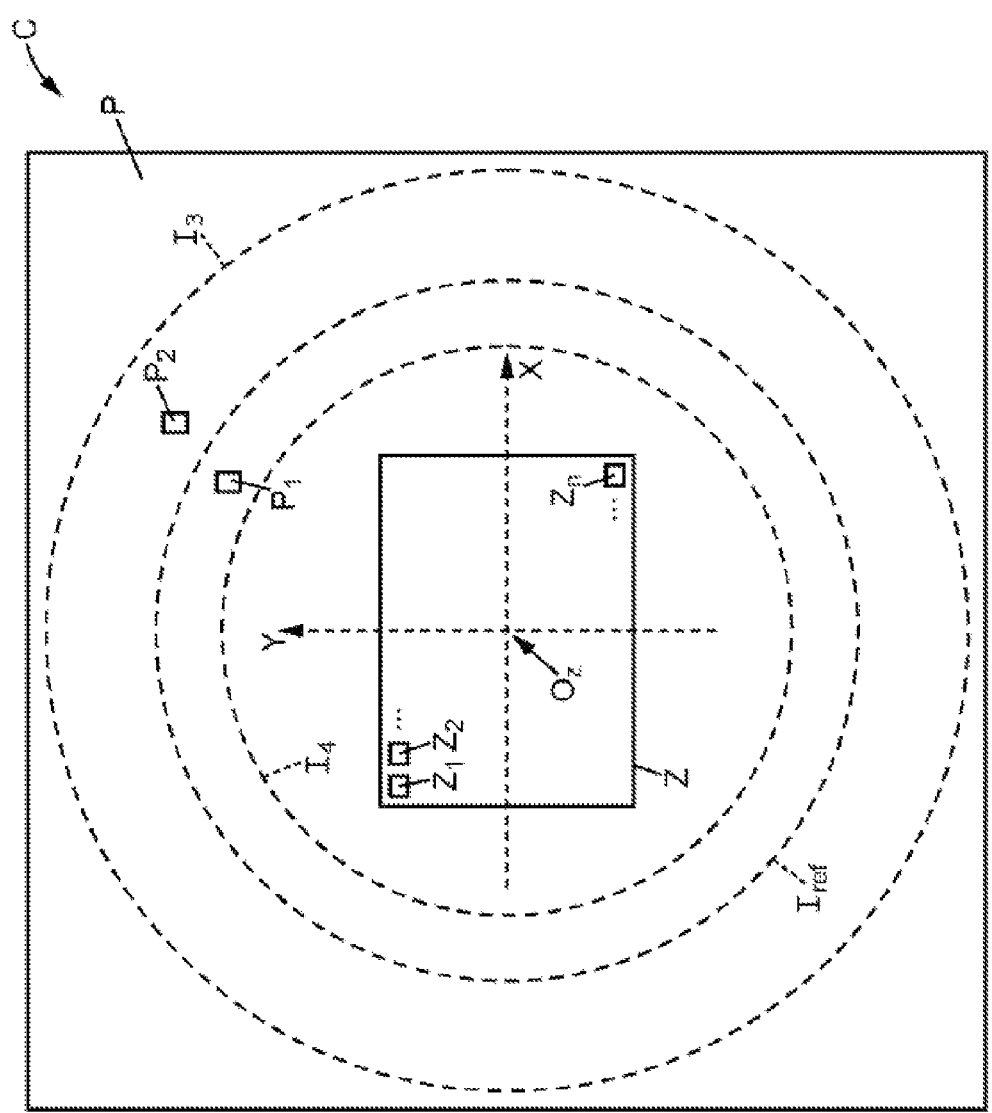
Figure 12:
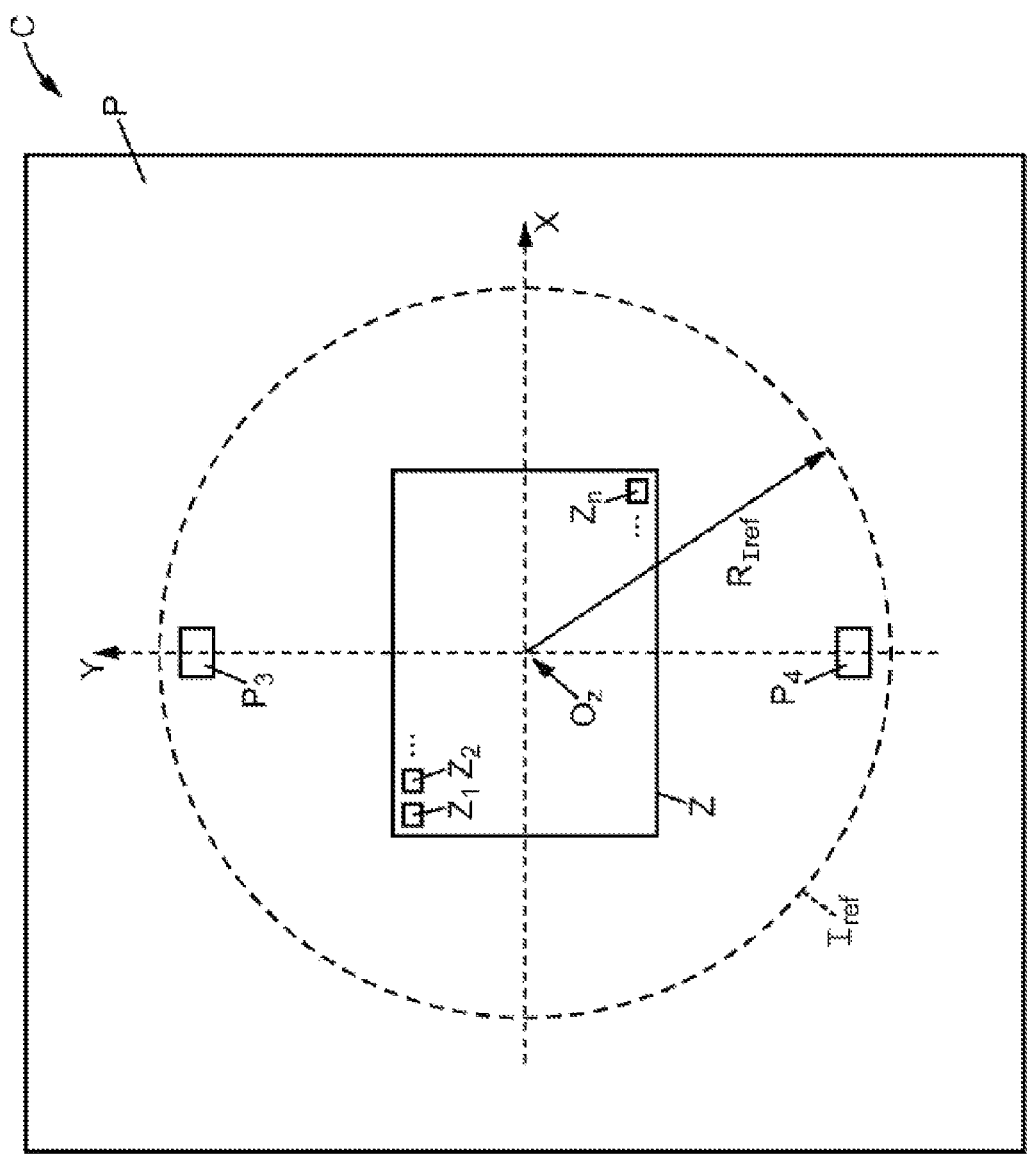
Figure 13:
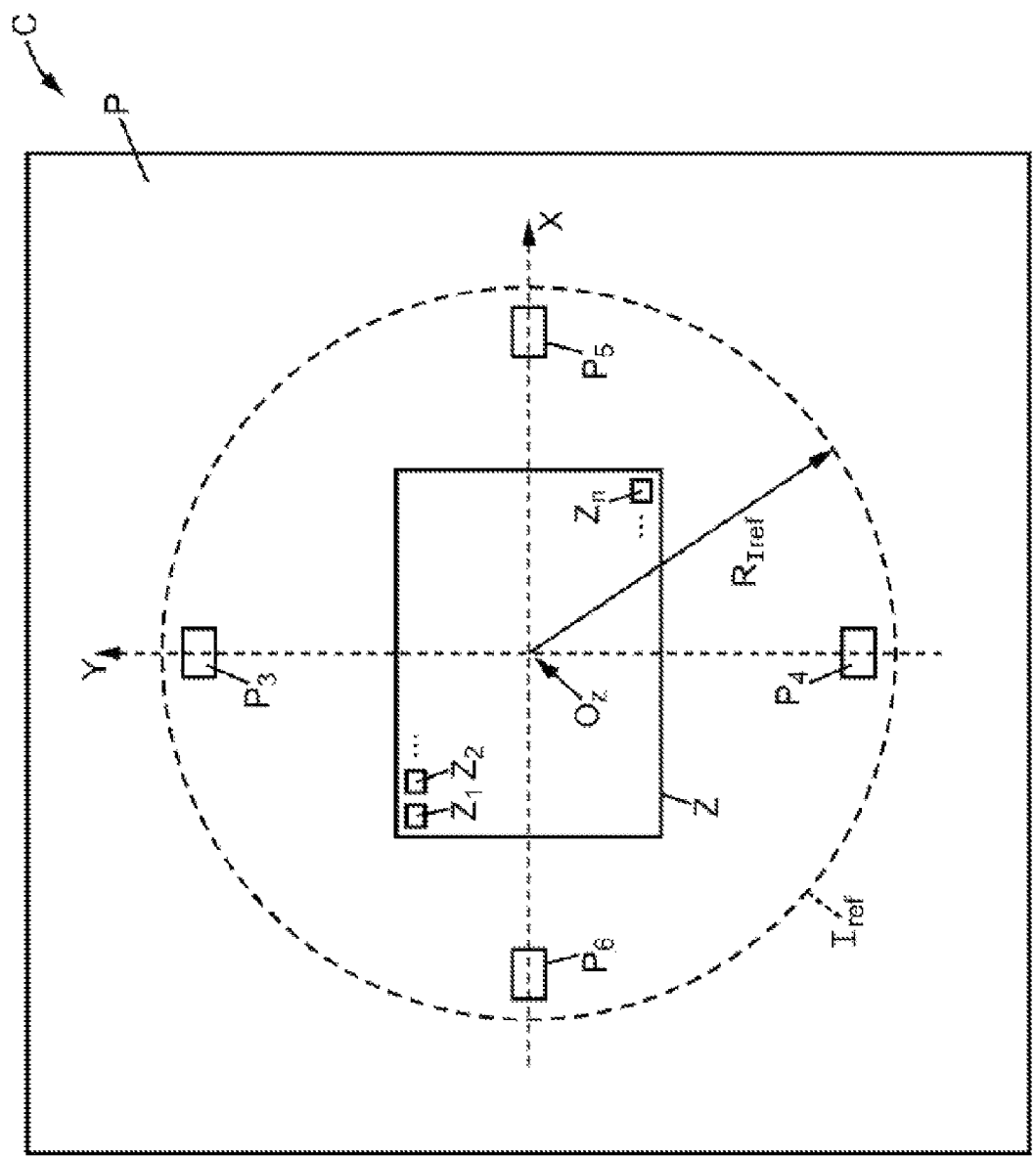
Figure 14:
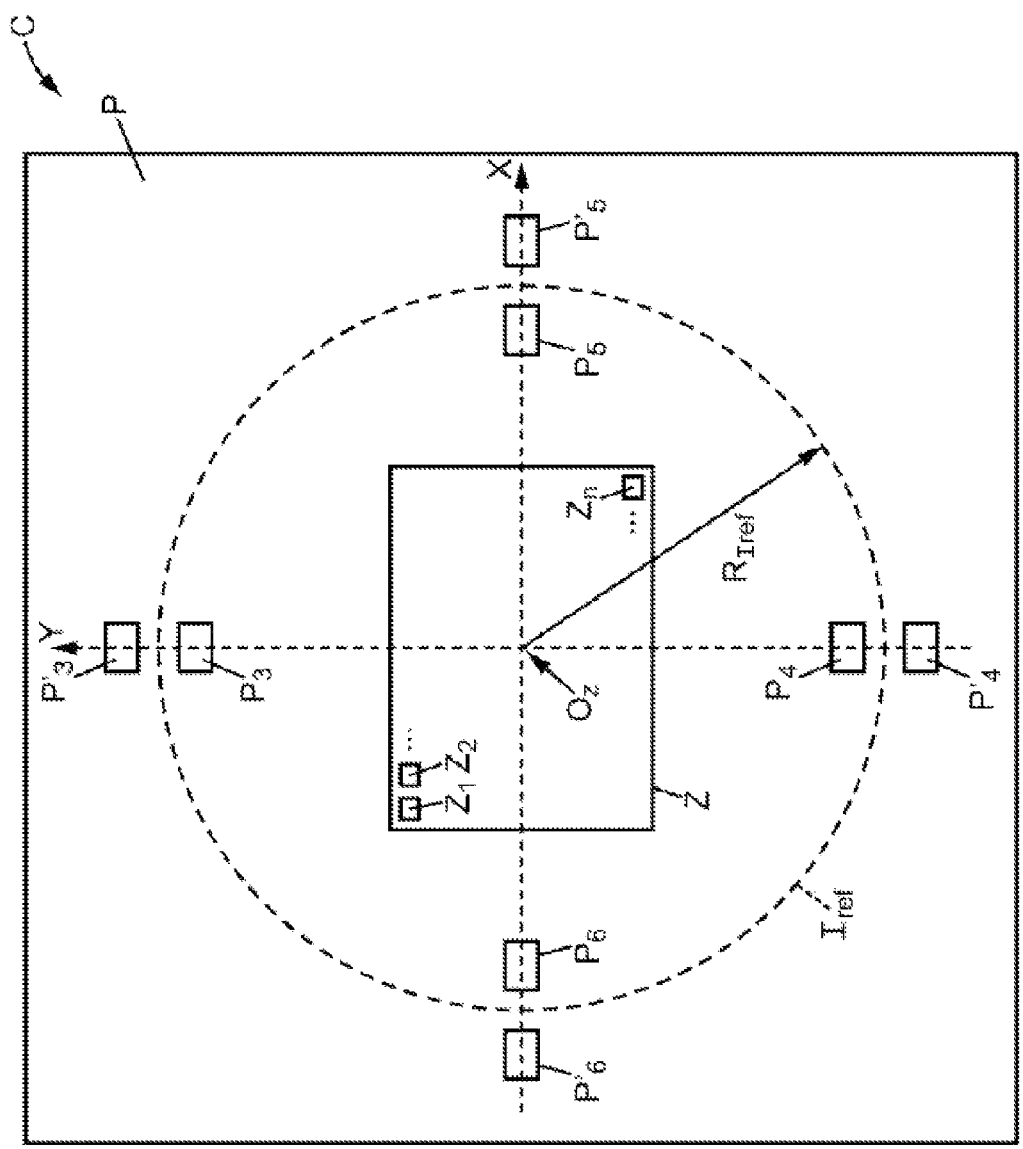
Figure 15A:
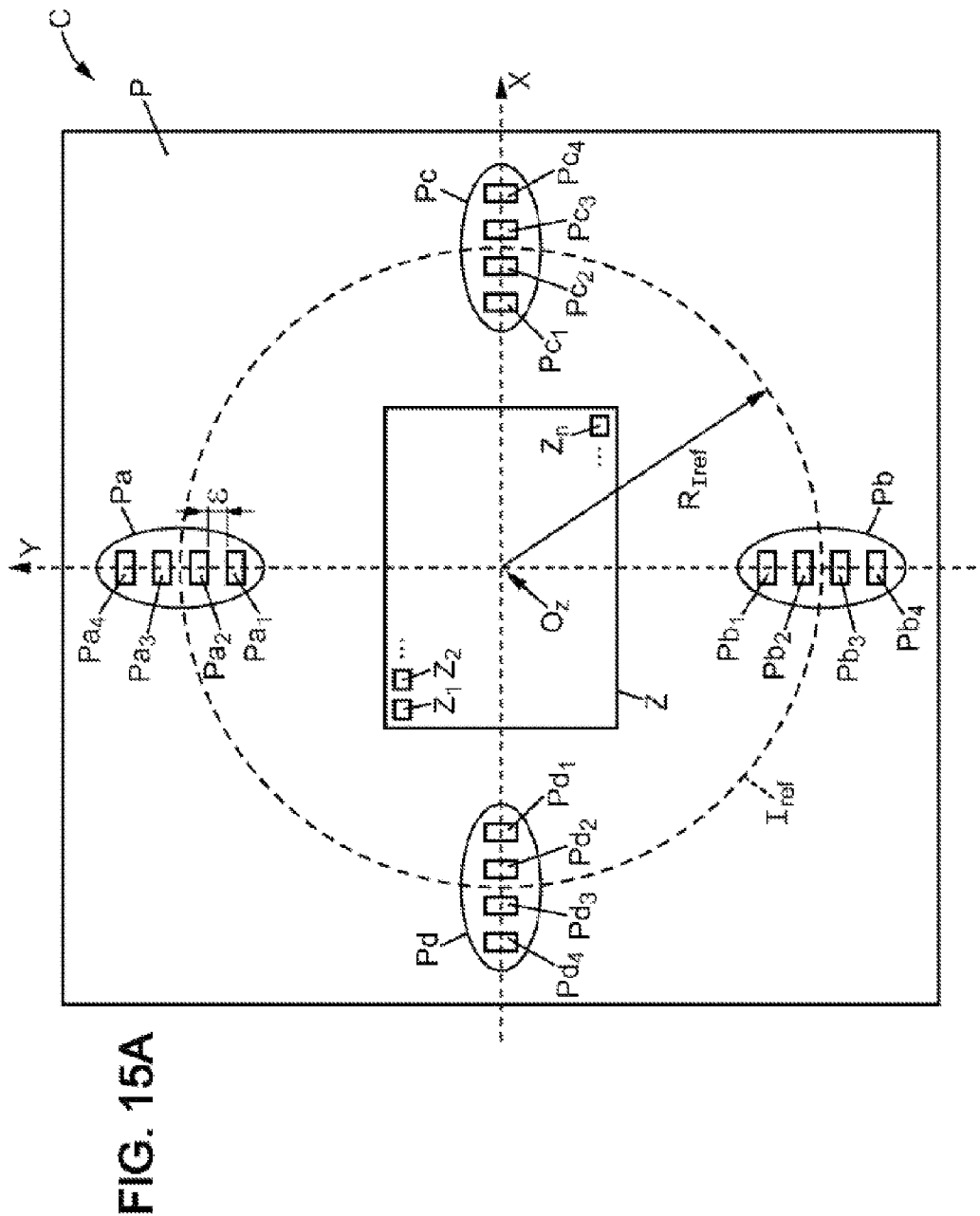
Figure 15B:
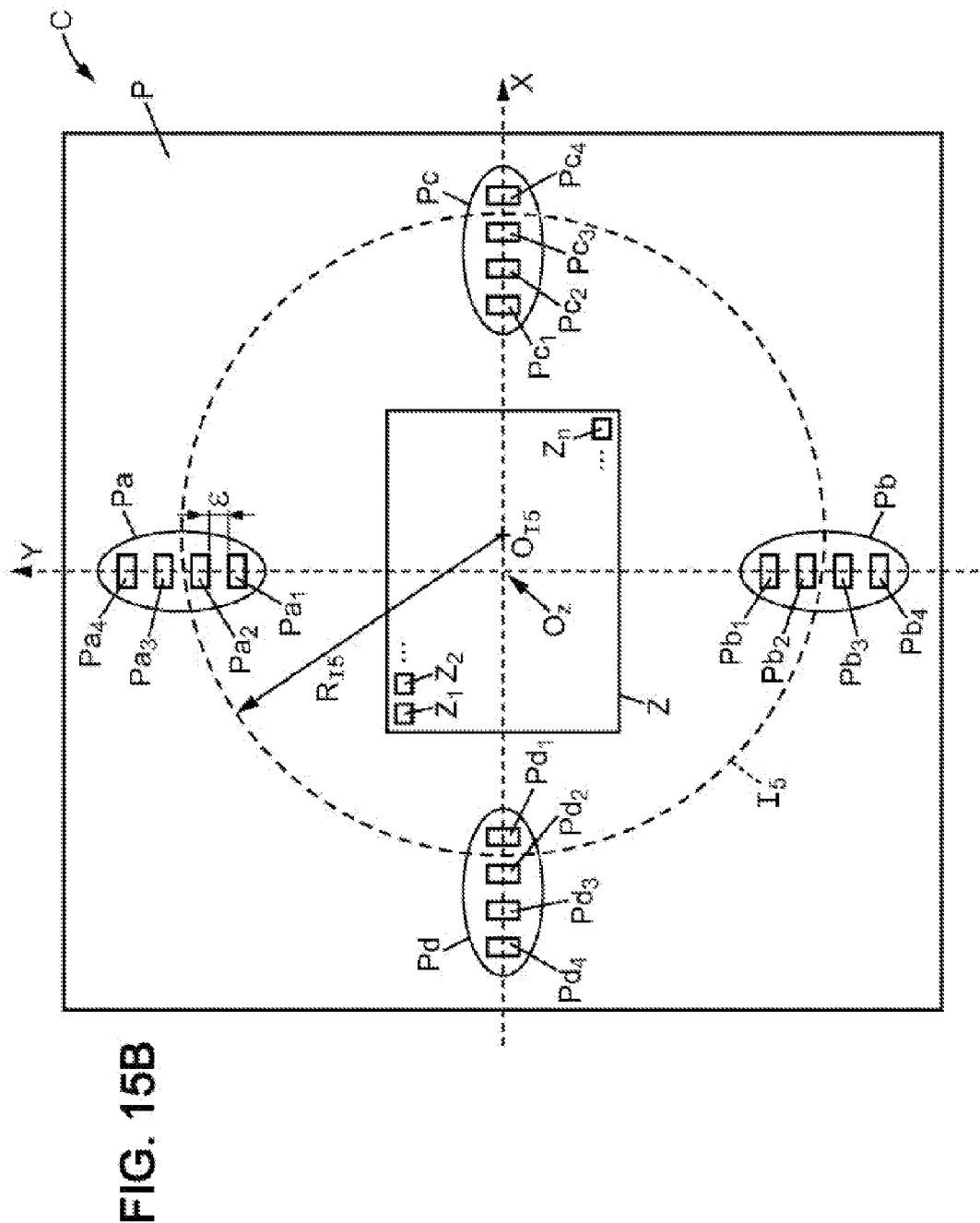
Figure 15C:
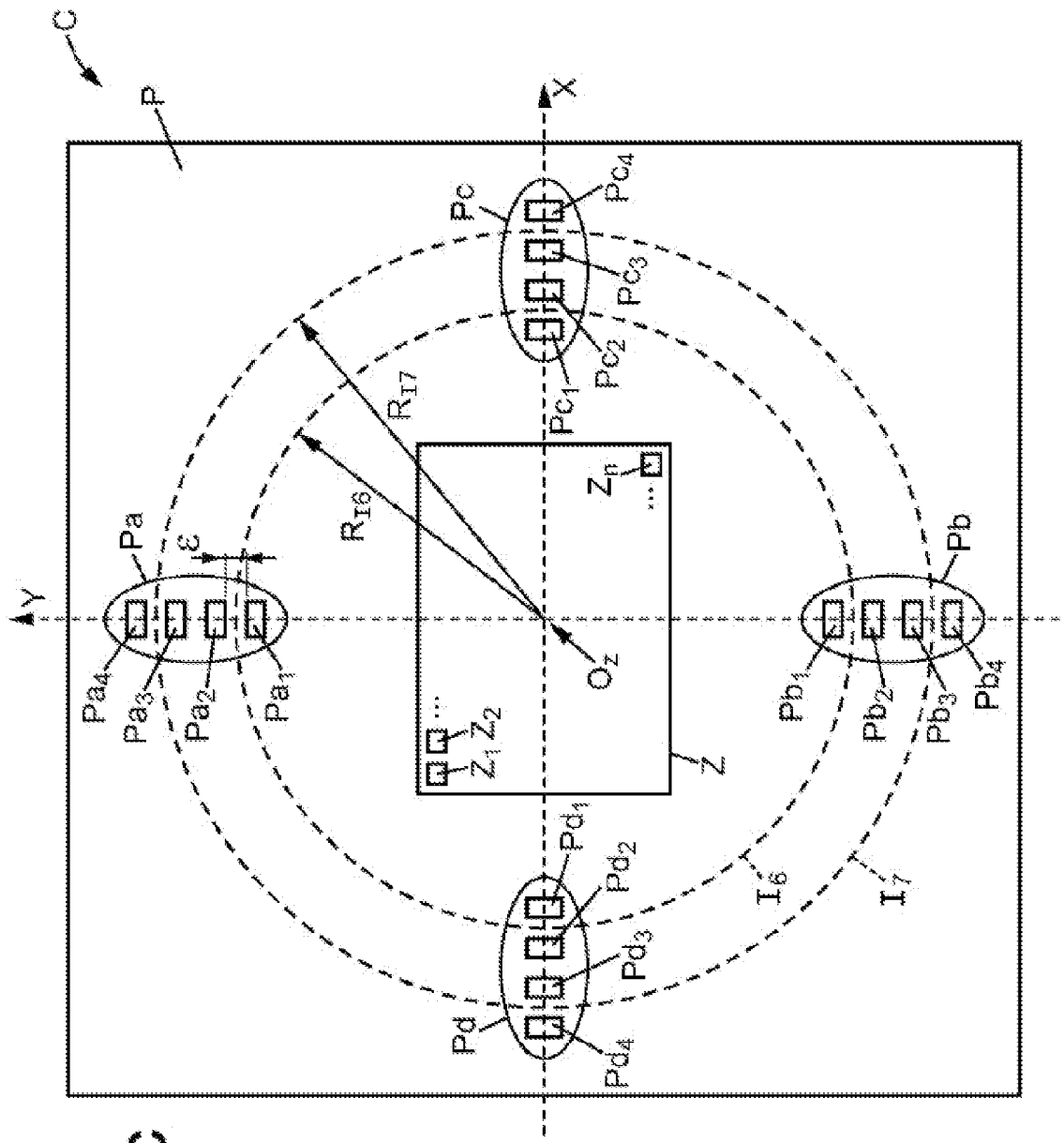

Other features and advantages of the invention will become apparent from the following non-limiting description of some examples, with reference to the drawings in which:

FIGS. 1A-1C, already discussed, illustrate a tilt defect in an optical sensor module, FIGS. 2A-2D, already discussed, illustrate a decentering defect in an optical sensor module, FIGS. 3A-3B, already discussed, illustrate a defocus defect in an optical sensor module, FIG. 4 is a diagram representing an image capture system in an exemplary embodiment of the invention, FIG. 5 is a flowchart illustrating a control method for an image capture system in an embodiment of the invention, FIGS. 6A and 6B illustrate a first embodiment of the invention, intended to detect an optical tilt defect of the module, FIG. 7 illustrates the concept of first-, second-, and third-nearest neighbor for the photosensitive elements of a sensor, FIG. 8 shows a particular example of the optical sensor module, comprising a sensor with a colored filter called a Bayer filter, FIG. 9 illustrates the image field concept, in a conventional rectangular sensor, FIG. 10A shows a characterization curve for the chief ray angle of a lens as a function of the position in the image field, FIG. 10B shows a graph of the difference in intensity received between elements Gr and Gb as a function of the angle of inclination of the light rays, for photosensitive elements Gr and Gb positioned at 60% in the image field, FIG. 10C shows a characterization curve for the difference in intensity received between elements Gr and Gb of a Bayer filter in the image field of a sensor, on its X axis, FIGS. 11A-11C show a first example of a sensor of an image capture system in a second embodiment of the invention, FIG. 12 shows a second example of a sensor of an image capture system in a second embodiment of the invention FIG. 13 shows a third example of a sensor of an image capture system in a second embodiment of the invention, FIG. 14 shows a fourth example of a sensor of an image capture system in a second embodiment of the invention, and FIGS. 15A-15C show a fifth example of a sensor of an image capture system in a second embodiment of the invention, FIG. 4 is a diagram representing an example of an image capture system in one possible embodiment of the invention.

In this FIG. 4, the image capture system 1 receives light originating from any scene S to be captured. The system 1 comprises an optical device L as well as a sensor C. The optical device L serves to focus the light emitted from the scene S on the sensor C. The optical device L and the sensor C form what is commonly referred to as an optical sensor module.

The sensor C comprises a plurality of photosensitive elements (for example pixels). Each photosensitive element, in response to the amount of light that it receives, can deliver an electrical intensity which can be expressed as a certain numerical value. Thus the sensor C converts the light received from the optical device L into a series of numerical values corresponding to an image in digital form. This raw digital image may be affected by certain optical defects, including those presented above.

To detect such defects, the system 1 of the invention additionally comprises a determination means DET for determining at least one deviation. This determination means DET, which may for example be a calculation module, within a processor for example, will receive the respective responses from certain photosensitive elements of the sensor C to an exposure of the image capture system to the scene S, as explained below, and will deduce at least one quantity G based on these responses. In certain cases, this quantity G can be representative of a state of the positioning of the optical device L relative to the sensor C.

The determination means DET also has access to at least one reference quantity Gref. This quantity Gref corresponds for example to a situation in which the optical device L and the sensor C are correctly positioned. It will be used as a calibration measurement to which the quantity G will later be compared.

Such a reference quantity Gref can also be defined by means such as initial characterization of the sensor C under different conditions, under several lighting angles for example. Such characterization will only be done once for a sensor type, and not, for example, systematically for each assembly of an optical device with a sensor. A quantity G subsequently obtained during everyday use of the system 1 can then be calculated based on any particular scene, and not require the use of a special scene.

A deviation Δ between the quantity G and the reference quantity Gref is then calculated by the determination means DET. This deviation Δ yields, for example, an indication of the state of the positioning of the optical device L relative to the sensor C. This deviation Δ can be for example proportional to the difference G-Gref between these two quantities, or to their ratio G/Gref. This deviation Δ can also assume any other form allowing the mathematical comparison of the two quantities G and Gref. This deviation can also assume the form of an index in a table providing a correspondence between the reference data and predetermined data.

With the system 1 as introduced above, it is possible to detect an optical defect in the optical sensor module. From this detection, the system 1 can advantageously be recalibrated at a repair shop or in the factory, for example.

In a variant, the detection of an optical defect of the optical sensor module can be used for purposes other than for correcting said defect. For example, it can be used as a diagnostic for the module, with no subsequent correction being made. A selection of one or more optical sensor modules can also be made by taking into account their respective optical defects if there are such. Other control mechanisms are also possible, as will be apparent to a person skilled in the art.

Advantageously, the system 1 additionally comprises an estimation means DEF for estimating an optical defect and possibly a compensation means COMP for compensating for the optical defect. The means DEF receives the deviation Δ determined by the determination means DET, and estimates based on this deviation Δ the type and amplitude of the optical defect involved. The means DEF then sends this information to the compensation means COMP. This compensation means COMP also receives from the sensor C the raw digital image affected by the optical defects. Taking into account the information originating from the estimation means DEF, the compensation means COMP will be able to compensate for the determined optical defect, either wholly or in part.

In this case, the compensation can occur without human intervention, for example at periodic intervals of time, or after the occurrence of certain events such as the system 1 suffering an impact. Such self-calibration is therefore more flexible than the prior art calibration mentioned in the introduction.

The compensation in question can occur in various forms, particularly as a function of the defect detected.

It may comprise mechanical actions, for example changing the tilt of the sensor and/or of the optical device in order to reduce or eliminate a defect in the relative tilt between these elements, a translation of the sensor and/or of the optical device within a plane substantially parallel to the sensor in order to reduce or eliminate a relative decentering defect between these elements, a translation of the sensor and/or the optical device in a direction substantially orthogonal to the sensor in order to reduce or eliminate a defocus defect of the lens relative to the sensor, or other actions. These mechanical actions are achieved for example by mechanical means, possibly controlled electronically.

Alternatively or additionally, such compensation may comprise an appropriate digital processing. The digital processing may be implemented by the image capture system 1 itself, by digital processing means situated downstream from this system, or shared between the image capture system 1 and the digital processing means downstream.

Two non-limiting examples of such digital processing are provided below. Other examples are of course possible, as will be apparent to a person skilled in the art.

A decentering defect of the lens relative to the sensor can modify the properties of the vignetting phenomenon (illustrated in FIG. 2C and discussed above). The "original" vignetting phenomenon, i.e. independent of the decentering, is generally corrected digitally either in the capture system, or by a specific means downstream. For example, the digital correction may be based on a vignetting correction model, as a function, for example, of the image coordinates of the pixel to be processed, of the lens-sensor pair used, etc.

To illustrate, let us take the simple case of a radial vignetting model, varying as a polynomial of order n.

The correction equation for a pixel in position (x,y) will be in the form: $f(x,y) = \text{sum}(a[i] * \text{square root } ((x-x_0)^2 + (y-y_0)^2))^i)$, $i = 0 \ldots n$, where:

$x_0, y_0$ are the coordinates of the center of the sensor and $a[i]$ of the parameters related to the lens. In the case of a decentering (dx, dy) detected and estimated by the invention, in the above model, $x_0$ is advantageously replaced by $x_0 + dx$ and $y_0$ by $y_0 + dx$ to digitally compensate for the decentering defect.

In another example, a defocus defect (as illustrated in FIGS. 3A and 3B) generates reduced sharpness in the image, because the focus distance is not optimum. Knowledge of the lens properties allows quantifying the reduction in sharpness as a function of the defocus. When defocus is detected by the invention, the amount of the sharpness reduction can be known, and it can be compensated for digitally by a sharpening technique (such as deconvolution or other techniques).

When the image capture system 1 is part of a digital capture device using digital processing means downstream from the capture system 1, the compensation by the compensation means COMP of the system 1 can be partial and be limited to modifying the received image in order to return an image having a certain degree of defect which can then be corrected by said digital processing means situated downstream. It may also consist of changing the parameters of the model used in the processing means located downstream, without affecting the image.

FIG. 5 is a flowchart illustrating a control method for an image capture system in one embodiment of the invention, as described for example in FIG. 4.

During a first step 100, the determination means DET obtains respective responses from certain photosensitive elements of the sensor C of the image capture system 1. These different photosensitive elements are at least two in number.

After this step, the determination means DET determines, during a second step 200, the deviation Δ between a quantity G, deduced from the response obtained during the step 100, and a reference quantity Gref, determined as explained above. This deviation allows detecting a possible optical defect in the capture system, such as improper positioning in the optical sensor module for example.

Advantageously, the method additionally comprises a step 300, during which the estimation means DEF estimates the optical defect of the capture system 1 based on the deviation Δ determined during the second step 200.

It then becomes possible, during a fourth step 400, for the compensation means COMP to implement a complete or partial compensation for the optical defect estimated during step 300.

Some different embodiments will now be presented to illustrate the invention.

FIGS. 6A and 6B illustrate the optical sensor module of an image capture system according to a first embodiment of the invention, intended to detect for example an optical defect related to a relative tilt between the sensor and the optical device as presented above in FIGS. 1A-1C.

In these FIGS. 6A and 6B, the optical device L and the sensor C of the image capture system are represented without the housing or the optical support which may possibly be part of the system, as these last elements are not essential to understanding this embodiment. Also represented is the deviation determination means DET receiving the response from certain elements of the sensor C.

The sensor C of the invention comprises a region Z in which is situated a plurality of photosensitive elements $Z_1$, $Z_2, \ldots, Z_n$. Each of these photosensitive elements is sensitive to a particular spectral band. Of these photosensitive elements, some may be sensitive to at least a portion of the spectral bands in common. It is also possible to have identical photosensitive elements among the photosensitive elements of the sensor C, which are therefore sensitive to the same spectral band.

The sensor C has, among the plurality of photosensitive elements $Z_1, Z_2, \ldots, Z_n$, at least two photosensitive elements $E_1$ and $E_1$, situated at different locations in the sensor and sensitive to at least one common spectral band. Due to their different positions, the light reaching these elements will come from a different angle, and therefore their respective responses in terms of intensities $I(E_1)$ and $I(E_1')$ representative of the amount of light received by each of these two elements will be different. This difference in intensity response can be expressed as a parameter G, corresponding to the quantity presented above, which is a function of the intensity responses $I(E_1)$ and $I(E_1')$.

When the sensor C and the optical device L are positioned perfectly, as is the case in FIG. 6A, meaning they are not angled relative to each other but are positioned in parallel planes, the parameter G calculated using one of the above formulas will have a reference value Gref, corresponding to the optimum position in terms of parallelism of the optical sensor module. The reference parameter Gref can also be calculated based on measurements of responses under initial illumination of the sensor alone, under certain specific conditions, such as particular angles of lighting for example. Such a reference value Gref can then be stored in the determination means DET, for example.

When the sensor C and the optical device L are no longer perfectly positioned, as is the case in FIG. 6B, meaning when they are tilted relative to each other by an angle α, the parameter G has a value different from Gref, which indirectly reflects this tilt defect. The relative comparison of this value G with the reference value Gref will provide a deviation Δ representing any tilt defect, which enables the detection of this defect. It will then be possible to have the optical system repaired or possibly to determine the optical defect and estimate it in order to initiate a compensatory action in the capture system itself.

In a first example, the elements $E_1$ and $E_1'$, for which the responses are used by the determination means DET, may be chosen from among any of the photosensitive elements $Z_i$ of the sensor C, as long as they are sensitive to at least one common spectral band. Thus, their intensity responses will have a high probability of being substantially homogeneous in terms of image content, and can be compared directly with no need to apply equalization processing between different spectral bands having spectral responses of varying sensitivity.

Advantageously, the quantity G deduced from the intensity response of the elements $E_1$ and $E_1'$ is a function of the mathematical comparison of these responses, such as for example a simple difference function $G=I(E_1)-I(E_1')$, a difference relative to the mean $G=(I(E_1)-I(E_1'))/(I(E_1)+I(E_1'))$ or indeed a ratio of intensities $G=I(E_1)/I(E_1')$. Other functions may be used to the extent that they are indicative of a difference in the light intensity received by these two elements. This allows eliminating, by mathematical comparison, the intensity component common to the two elements $E_1$ and $E_1'$, corresponding to the content of the captured image in the common spectral band. The intensity component related to the tilt angle α can then more easily be distinguished.

Advantageously, the two elements $E_1$ and $E_1'$ for which the response is used by the means DET are chosen to be near neighbors. They are first-nearest neighbors, meaning adjacent to each other, or second-nearest neighbors, meaning they are not adjacent to each other but there is at least one other photosensitive element to which they are both adjacent, for example, although this is not a limiting example. This concept of near neighbors is illustrated in FIG. 7.

FIG. 7 shows a conventional sensor C', viewed from above, comprising a plurality of photosensitive elements. For reasons of practicality and efficiency, the photosensitive elements of a sensor are usually arranged in a bi-directional grid. Starting from a first photosensitive element $V_0$, the first-nearest neighbors are those adjacent to $V_0$ in one of the two directions of the grid. These first-nearest neighboring elements are the elements $V_1$ in FIG. 7. By extension, the second-nearest neighboring elements $V_2$ of $V_0$ are the first-nearest neighboring elements of the first-nearest neighboring elements $V_1$ of the element $V_0$, this element $V_0$ itself being excluded. By extension, the third-nearest neighboring elements $V_3$ of $V_0$ are the first-nearest neighboring elements of the second-nearest neighboring elements $V_2$ of the element $V_0$, excluding the elements $V_1$, and so on.

When using neighboring elements $E_1$ and $E_1'$ of a lower order to obtain the response used to calculate the quantity G, the probability of content variations during the capture of a scene not containing strong transitions (in other words high frequencies) is very low, and the component of the received intensity which is related to the content of the image itself is substantially the same for the two elements $E_1$ and $E_1'$.

In the typical case of a sensor comprising a regular repetition of a base pattern comprising at least two elements $E_1$ and $E_1'$ sensitive to at least one common spectral band, this means choosing these two elements $E_1$ and $E_1'$ in the same base pattern, for example.

This advantageous characteristic allows obtaining a more reliable measurement, to the extent that the captured image may have areas that are more or less dark at different locations. In such case, comparing the intensity received from a first element situated in a dark region to the intensity received from a second element situated in a brighter region would distort the measurement of the tilt angle α. If the two elements are chosen within the same region of limited size, they will receive relatively uniform brightness information, and therefore the comparison of their respective intensities will more effectively eliminate the unnecessary intensity component, which will better emphasize the component related to the angle α.

The invention is not limited to using the response from first- or second-nearest neighbor elements. One can consider using the response from higher order neighbors, as long as relatively uniform responses are obtained compared to the spectral content of the image received by the sensor C.

Advantageously, the above reasoning with only two photosensitive elements $E_1$ and $E_1'$ can be made with a plurality of pairs of photosensitive elements ($E_1, E_1'$), advantageously sensitive to a same common spectral band. Increasing the number of elements used to give a response eliminates any image transition zones in which the method would no longer work with only two elements, if these elements were on each side of this transition zone. This additionally allows reducing the effect of noise on the measurement.

In this case, when the sensor C and the optical device L are perfectly parallel as in FIG. 6A, instead of obtaining a single reference parameter Gref, a series of specific reference parameters $Gref_i$ are obtained, determined for each pair of photosensitive elements ($E_i, E_i'$) as a function of their position in the image field. Such specific parameters may be determined initially, for example by illuminating the sensor from different angles, and stored in a memory associated with the capture system 1 in order to perform the comparison at a later time. This series of specific parameters can be stored in the determination means DET.

Thus, when the sensor C and the optical device L are tilted relative to each other as in FIG. 6B, then for each pair of photosensitive elements ($E_i, E_i'$) used, a quantity ($G_i$) is deduced from the response of the photosensitive elements belonging to said pair as a function of the intensity responses $I(E_i), I(E_i')$ of the two photosensitive elements $E_i$ and $E_i'$ constituting this pair. For each pair (Ei, Ei'), the value of the quantity $G_i$ obtained is compared with the corresponding reference value Gref, in order to obtain a deviation $\Delta$ specific to this pair. A series of deviations $\Delta$ specific to each pair is then obtained.

A general deviation $\Delta_G$ may possibly be calculated from these specific deviations $\Delta_i$. This general deviation $\Delta_G$ can be, for example, the mean of all specific deviations $\Delta_i$, or their median value, or any other value allowing a general characterization of all these specific deviations $\Delta$. Any later estimation of an optical defect of the image capture system can be based on a general deviation $\Delta_G$. In a variant, it can be based on some or all of the specific deviations $\Delta_i$.

For example, in the case illustrated in FIGS. 6A and 6B where two pairs ($E_1, E_1'$), ($E_2, E_2'$) are used, two specific deviations $\Delta_1$ and $\Delta_2$ are obtained, in which $\Delta_1 = G_1 - Gref_1$ where $G_1 = I(E_1) - I(E_1')$, and $\Delta_2 = G_2 - Gref_2$ where $G_2 = I(E_2) - I(E_2')$ for example. In a non-limiting example, one can then determine a general deviation $\Delta_G = (\Delta_1 - \Delta_2)/2$ corresponding to the mean of the two specific deviations of each pair.

Calculating a general deviation $\Delta_G$ in the manner indicated above is particularly advantageous when the different pairs of photosensitive elements ($E_i, E_i'$) from which the response is used are substantially near each other. To the extent that the reference quantity changes as a function of the image field, one can envisage, in the case where the different pairs of photosensitive elements ($E_i, E_i'$) from which the response is used are not near one another, calculating specific angles $\alpha_i$ for each of the pairs in order to obtain from them a general angle $\alpha_G$ corresponding for example to the mean of the specific angles $\alpha_i$.

This is particularly advantageous when the sensor C receives an image having a significant transition, indicated in FIGS. 6A and 6B by a border T, between a zone of low brightness to the left of this axis T and a zone of high brightness to the right of this axis T. The use of a single pair ($E_1, E_1'$) would give a distorted measurement, because these two elements are on each side of the transition, presenting highly contrasting intensity responses. The specific parameter $G_1 = I(E_1) - I(E_1')$ and therefore the specific deviation $\Delta_i$ can then assume exaggerated values not reflecting the degree of the tilt angle $\alpha$, which may be relatively low in comparison.

If one now includes in the calculation the second pair ($E_2, E_2'$), here we see that these two elements are on the same side of the transition in the image, and their measurement will be much more homogeneous and will yield a parameter $G_2$ and a specific deviation $\Delta_2$ that are much more reliable, which will weight the distorted deviation $\Delta_1$ in the calculation of the general deviation $\Delta_G$ mean of these two specific deviations.

This example of two pairs of elements is of course not limiting. One can, for example, take the response from any group of photosensitive elements $E_i$ belonging to an nth-nearest neighborhood (meaning any element $E_i$ of this group is a neighbor of an order less than or equal to n of any other element $E_i$ of this group). One can then verify whether this group of elements $E_i$ is associated with a homogeneous region of the image. If such is the case, a reliable quantity G can be calculated, and a deviation $\Delta$ deduced from it which will allow detecting and estimating the tilt angle $\alpha$. If this group is not associated with a homogeneous region of the image, it is not used and another is chosen, and so on.

Advantageously, when the determination means DET uses the responses from a plurality of pairs ($E_1, E_1'$), these pairs are part of a selected region E of the sensor C. This region E, which represents a subpart of the surface of the sensor, can be chosen for receiving a homogeneous region of the image excluding the regions with high frequencies, synonymous with transitions and therefore with potential measurement errors. Such a region can be determined by methods known to a person skilled in the art, for example by using sensor noise curves, or using information on other channels, situated in other spectral bands besides those of the photosensitive elements used.

A more specific example of this first embodiment will now be described in detail.

FIG. 8 partially illustrates an image capture system having an exemplary sensor comprising a common example of a color filter, called a Bayer filter, often found in current digital image capture devices.

In the image capture system in FIG. 8, similar to the system in FIGS. 6A and 6B but in which only certain specific elements are represented, the sensor C is formed by superimposing a color filter FIL and a light-sensitive substrate SUB. The light, coming from a source S and passing through an optical device L as described above, illuminates the color filter F. This filter spatially filters the light into different spectral bands and breaks it apart into beams of different colors, which will strike the substrate SUB at different locations. Such an arrangement allows dividing the light into different components in a defined pattern, for example a grid, for more appropriate processing and transmission.

It is common, for example, to use a color filter FIL which divides the filtered light into its three components: red, blue, and green. This allows receiving intensities at different points on the substrate which correspond to these different components, and using them to reconstruct the image at a later time.

In the present case, the Bayer filter consists of the repetition in two dimensions of a base pattern Mb of 2×2 filtering elements, an element B to filter blue, an element R to filter red, and two elements Gr and Gb to filter green. The green spectral band is the central band in the light spectrum and generally contains more information than the others. As the human eye is more sensitive to this band, the choice was made to have two elements Gr and Gb for detecting green in this type of filter.

A typical defect affecting this type of filter is what is referred to as crosstalk. Here it means the fact that when photons reach a photosensitive element, they are partially deflected towards neighboring photosensitive elements. The invention makes use of such a phenomenon, normally detrimental, in a positive way in order to better detect an optical defect.

To do this, the comparison of the intensities $I(E_1)$ and $I(E_1')$ of the responses as explained above, will be applied to the response intensities of two elements Gr and Gb of a same base pattern Mb of a Bayer filter. As these two elements are close to each other, they undergo a crosstalk phenomenon and their response therefore contains a component of correlated information, which can be even more easily eliminated by comparing their two intensities, which will improve the observation of the tilt angle $\alpha$. In the present case, the quantity G as defined above will therefore issue from the comparison of the intensity I(Gr) received by an element Gr and the intensity I(Gb) received by an element Gb of a same base pattern. Again, this comparison can be made using the difference, ratio, or difference relative to the mean between the two respective intensity values, or other methods. In the present example, difference means the measurement used for the comparison between these two values I(Gr) and I(Gb), expressed as a percent.

In order to express the intensity values as a function of the position of the photosensitive elements in a sensor, the concept of image field is introduced below, because it provides a better understanding of the example. FIG. 9 illustrates this image field concept.

The sensor presented in the example in FIG. 9 has the rectangular "4:3" form, meaning its image width h is equal to 4/3 the image height v.

Here the concept of image field is used to indicate the distance relative to the center of the sensor in FIG. 9. For example, a position at 100% in the image field corresponds to a position on one of the corners of the rectangular sensor, which corresponds to a maximum distance relative to this center equal to the diagonal of the rectangle. A position on one of its sides is at 80% or 60% in the image field (absolute value), with the sign indicating which side relative to the center. Lastly, the center of the sensor is at 0% in the image field.

FIG. 10A shows a curve representing the chief ray angle (CRA) property of a lens, as a function of the position in the image field. Such a curve characterizes the optical device associated with the sensor, and does not depend on the sensor. For example, at a position of 60% in the image field, the chief ray angle is 20°.

FIG. 10B shows a curve characterizing the difference between the photosensitive elements Gr and Gb, expressed as percents, for a given sensor, as a function of the angle of incidence of the rays on the elements for a given position in the image field. In this example, the given position corresponds to 60% in the field on the X axis of the sensor. This curve does not depend on the optical device associated with the sensor.

If one considers an optical device characterized by its CRA represented in FIG. 10A, mounted on a sensor characterized by crosstalk at 60% in the field given in FIG. 10B, one expects to have, at 60% in the image field, a difference of 0% between Gr and Gb. The reference quantity Gref for this position is obtained as explained above, and is used to determine the deviation $\Delta$ according to step 200 of the first embodiment.

For a module consisting of the optical device mounted on the sensor, as described in the above paragraph, FIG. 10C shows a record of the difference, in percents, between the intensities received by the photosensitive elements Gr and Gb belonging to the same base pattern, as a function of the position on a horizontal axis X of a rectangular sensor. The abscissa are expressed as image field percentages as explained above.

To obtain such a curve, one can for example illuminate a sensor as described in FIG. 8 during an initial phase and observe the response of two elements Gr and Gb of a same pattern at different locations on the horizontal axis X. The percentage difference between the two intensities will be measured for each positional value in the image field, which gives the characterization curve in FIG. 10C.

One will note in this curve that the farther one is from the center, the greater the difference between elements Gr and Gb. This is directly related to the average angle of the optical device, which increases with the position in the image field.

One can see in FIG. 10C that for a pair of photosensitive elements situated at about 60% in the field, a difference of about 5% between element Gr and element Gb is measured. This measurement corresponds to a ray angle of incidence of 30° according to the curve in FIG. 10B. However, it appears from the reference curve in FIG. 10C that at 60% in the field, the ray angle of incidence should be 20° for a normal positioning. From this, the tilt angle $\alpha$ is determined to be 30−20=10°.

In the same manner, one can also obtain the response of the elements Gr and Gb belonging to neighboring base patterns Mb, Mb1, Mb2 and Mb3 in a defined region of the sensor. This yields a series of values which allow averaging the measurement and therefore eliminating any transition phenomena. The greater the number of base patterns used, the more the measurement is averaged and therefore freed of noise, although this increases the probability of encountering a non-homogeneous region in the image.

Note that such an estimate of the difference between the intensities received by the photosensitive elements Gr and Gb of a module can be done based on an image, a region of the image, or a set of regions of the image. In addition, such an estimate of the difference between intensities of the elements Gr and Gb is also possible on a video stream, on a subsampled version of the image.

Preferably, the estimate can be done with prior knowledge of the model of crosstalk variation between elements Gr and Gb, as illustrated in FIG. 10C. The measurements made on the image then serve to adapt to a parametric model, which allows decreasing measurement-related errors and having more advanced applications based on these estimates.

In the example here, photosensitive elements sensitive to the color green were used for measuring the tilt defect, because the Bayer filter has the particular characteristic of having a microstructure with two distinct green elements. The use of this particular spectral band is advantageous, because the spectral response in this band is more sensitive, particularly in the human eye. Also, as this spectral band is located in the middle of the visible spectrum, most images will have components in this band, and in any case many more than with the other spectral bands red and blue. Thus any image can be used to detect a relative tilt angle, without needing to make a specific choice of a certain type of image for performing the measurement. However, the invention is not limited to this example, and any elements sensitive to another color can be used.

Other examples of an optical sensor module of an image capture system, according to a second embodiment of the invention for detecting a decentering or defocus defect of this module, will now be presented.

FIG. 11A shows a top view of a sensor C that is part of an optical sensor module similar to those presented above. Such a sensor advantageously has a central image capture region Z, comprising a certain number of photosensitive elements $Z_i$ dedicated to capturing incident photons in order to reconstruct an image, surrounded by a peripheral region P which does not comprise pixels dedicated specifically to capturing images and therefore not contributing to the image capture. The central region Z is described in this example as being rectangular, with a center $O_Z$ situated at the intersection of its diagonals, meaning at the intersection of its two orthogonal axes of symmetry X and Y. However, any other form of image capture region can be envisaged, such as a circular form.

The optical device L, associated with the sensor C in the image capture system of the invention and not represented in this top view, will illuminate the sensor C with light coming from the source S, in an illuminated region of a shape which depends on the shape of the device L itself. In the present example, the optical device L is circular and will therefore present a circle of illumination $I_{ref}$ on the sensor C. The light intensity received outside this circle of illumination $I_{ref}$ is practically zero. The size of this circle will depend on the distance separating the optical device L and the sensor C, as illustrated in FIGS. 3A and 3B above.

The example in FIG. 11A represents the case where the optical device L is centered on the sensor C, meaning the case where the center of the circle of illumination $I_{ref}$ and the center $O_Z$ of the central region Z coincide, and an optimal focus distance F separates the optical device L and the sensor C. The circle of illumination $I_{ref}$ then has a radius $R_{Iref}$ and constitutes a reference circle of illumination, corresponding to an optimum position of the optical device L in terms of decentering and defocus relative to the sensor C.

In addition to the photosensitive elements Z dedicated specifically to capturing images, the sensor C has a certain number of photosensitive elements $P_i$ situated in the peripheral region P of the sensor C and having a response which allows detecting a decentering or defocus defect as respectively illustrated in FIGS. 2A-2D and 3A-3B above. These photosensitive elements $P_i$ can, for example, have a binary digital response, meaning a response of "0" when the light intensity received is less than a first threshold and a response of "1" when the light intensity received is greater than a second threshold which is greater than the first threshold. The invention is not, however, limited to this type of photosensitive element, and any type of element that allows distinguishing a level of high light intensity from a level of low light intensity can be used.

In the present example, the sensor C has a first photosensitive element $P_1$ situated inside the reference circle of illumination $I_{ref}$, as well as a second photosensitive element $P_2$ situated outside the reference circle of illumination $I_{ref}$. The response of these two elements $P_1$ and $P_2$ can be used to determine a reference quantity Gref, for example by the sum of the light intensities received by $P_1$ and $P_2$ using the formula $Gref=I(P_1)+I(P_2)$. In this case, considering that a photosensitive element $P_i$ receives either a non-zero intensity when it is within the circle of illumination, or an intensity close to zero when it is outside the circle, and using photosensitive elements $P_i$ with a binary response, the value of Gref will be non-zero.

FIG. 11b illustrates two cases where the optical device L is decentered relative to the sensor C in the direction of its X axis.

In a first case where the optical device L is offset to the right of the sensor C, it will project a circle of illumination $I_1$ of center $O_{I1}$ on the sensor C. In this case, the two elements $P_1$ and $P_2$ are part of the circle of illumination $I_1$, and the quantity G, determined based on their intensity response in a manner identical to the reference quantity Gref, will have a value equal to 2. By then determining a deviation $\Delta$ between this quantity G and the reference quantity Gref, using a calculation as described above, the fact that this deviation $\Delta$ is substantial will be indicative of a decentering defect. For example, if the deviation $\Delta$ corresponds to the difference between G and Gref, $\Delta$ is no longer zero but here has the value of "1", indicative of an optical positioning defect.

In a second case, this time with the optical device L offset to the left of the sensor C, the device will project onto the sensor C a circle of illumination $I_2$ having a center $O_{I2}$. In this case, the two elements $P_1$ and $P_2$ are no longer a part of the circle of illumination $I_2$ and the quantity G, still determined in a manner identical to the reference quantity Gref, will have a zero value. Again, the determination of a substantial deviation $\Delta$ between this quantity G and the reference quantity Gref (here for example $\Delta=G-Gref=-1$) will be indicative of an optical positioning defect.

FIG. 11C illustrates two other cases, where the optical device L is defocused relative to the sensor C.

In a first case where the distance between the optical device L and the sensor C is greater than the optimum focus distance F, the circle of illumination $I_3$ projected onto the sensor C will be larger than the reference circle of illumination $I_{ref}$. In this case, the two elements $P_1$ and $P_2$ are part of the circle of illumination $I_3$, similarly to the case presented above with FIG. 11B where the optical device was decentered to the right of the sensor C, and the quantity G, determined similarly to the previous cases, will have a value of "2". The determination of a deviation $\Delta$ between this quantity G and the reference quantity Gref (for example $\Delta=G-Gref=1$) will therefore be indicative of an optical positioning defect.

In a second case where the distance between the optical device L and the sensor C is smaller than the optimal focus distance, this time the circle of illumination $I_4$ projected onto the sensor C will be smaller than the reference circle of illumination $I_{ref}$. In this case, the two elements $P_1$ and $P_2$ are no longer a part of the circle of illumination $I_4$, similarly to the case presented above with FIG. 11B where the optical device was decentered to the left of the sensor C, and the quantity G, determined from their intensity response in a manner identical to determining the reference quantity Gref, will have a zero value. The determination of a deviation $\Delta$ between this quantity G and the reference quantity Gref (for example $\Delta=G-Gref=-1$) will therefore again be indicative of an optical positioning defect.

With the first example of a sensor presented above, a decentering or defocus optical defect can therefore be detected, without necessarily needing to distinguish what type. The following examples concern a sensor which advantageously allows distinguishing the type of optical defect involved.

A second example of a sensor C is represented in a top view in FIG. 12. This sensor C is similar to the one presented in FIGS. 11A-11C, except that it has two photosensitive elements $P_3$ and $P_4$, situated in the peripheral region P, for example inside the circle of illumination $I_{ref}$ and on a Y axis passing through the center $O_Z$ of the rectangular central region Z, advantageously at equal distances from the center $O_Z$ of the region, in order to obtain more concrete information. This Y axis can for example be an axis of symmetry of the region Z. The reference quantity Gref may correspond to the sum of the responses of the two elements $P_3$ and $P_4$, for example, which here gives a value of "2".

If, in a first case, the optical device L is decentered along the Y axis, in the downward direction for example, the element $P_3$ will no longer be illuminated while the element $P_4$ will remain so. The quantity G will then only have a value of "1". If, in a second case, the optical device L is closer to the sensor C, the circle of illumination will shrink to the point where the two elements $P_3$ and $P_4$ are no longer illuminated. The quantity G then assumes the value of zero. On the other hand, when elements $P_3$ and $P_4$ are situated outside the circle of illumination $I_{ref}$, one can detect an increase in the distance between the optical device L and the sensor C in the same manner.

Determination of the deviation Δ between the quantity G and the reference quantity Gref then allows distinguishing the type of optical defect involved. If one considers, for example, that the deviation Δ corresponds to the difference between G and Gref, then the absolute value of this deviation Δ will be "1" when there is decentering, and "2" when the optical device L and the sensor C are too close together. The deviation Δ is therefore a good indicator of the type of defect.

In this second example in FIG. 12, a decentering along the axis Y of the region Z can be detected and differentiated from a defect related to the optical device L being too close to the sensor C.

A third example, illustrated in FIG. 13, consists of extrapolating from the example in FIG. 12 by additionally using the response of two other photosensitive elements $P_5$ and $P_6$, still located within the peripheral region P, inside the circle of illumination $I_{ref}$ and on the X axis of symmetry of the central rectangular region Z, at equal distances from the center $O_Z$ of the region. The reference quantity Gref can then correspond to a pair of relative reference quantities (Gref$_1$, Gref$_2$) respectively corresponding to the sum of the responses from elements $P_3$ and $P_4$, and from elements $P_5$ and $P_6$, for example. The reference quantity Gref here will have the value (2,2).

With the example in FIG. 13, it is now possible to detect and differentiate a decentering along the X axis or along the Y axis, by determining a deviation Δ corresponding for example to the respective differences of the relative quantities $G_1$ and $G_2$ respectively associated with the pairs of elements ($P_3,P_4$) and ($P_5,P_6$) and their associated reference quantities Gref$_1$ and Gref$_2$.

For example, if the quantity G has the value (1,2), where $G_1=1$ and $G_2=2$, the deviation Δ calculated as ($G_1$–Gref$_1$, $G_2$–Gref$_2$) then has the value (1,0) which indicates a decentering along the Y axis. If the quantity G has the value (2,1), the deviation Δ then has the value (0,1), which indicates a decentering along the X axis. Lastly, if the quantity G has the value (0,0), the deviation Δ then has the value (2,2), which indicates a focus defect due to the optical device L and the sensor being too close together.

In this third example in FIG. 13, a decentering along the Y or X axis of the region Z can be detected and differentiated from a defect related to the optical device L being too close to the sensor C.

A fourth example, illustrated in FIG. 14, consists of extrapolating the example in FIG. 13 by additionally using the response from four other photosensitive elements $P_3',P_4',P_5'$ and $P_6'$ situated within the peripheral region P, outside the circle of illumination $I_{ref}$ on the X and Y axes of the rectangular central region Z, at equal distances from the center $O_Z$ of the region. The reference quantity Gref can then correspond to a series of four relative reference quantities Gref$_i$ for each of the pairs of elements ($P_i,P_i'$) corresponding for example to the sum of the associated responses from elements $P_i$ and $P_i'$. The general reference quantity Gref here will have the value (1,1,1,1).

With the example in FIG. 14, it now becomes possible to detect and differentiate not only a decentering along the X or Y axis, but also a focus defect due to the optical device L and the sensor C being either relatively further apart or closer together. This is obtained by determining a deviation Δ corresponding for example to the series of respective differences of the relative quantities $G_i$ to the pairs of elements ($P_i,P_i'$) and the relative reference quantities Gref$_i$ to these same pairs ($P_i,P_i'$).

For example, if the general quantity G has the value (0,0,0,0), meaning if no element is illuminated, the deviation Δ then has the value (−1,−1,−1,−1), indicating a focus defect due to the optical device L being too close to the sensor C. Conversely, if the general quantity G has the value (2,2,2,2), meaning all the elements are illuminated, the deviation Δ then has the value (1,1,1,1), indicating a focus defect due to the optical device L being too far away from the sensor C.

With the examples presented in FIGS. 12 to 14, it is possible to detect and differentiate a decentering or defocus optical defect. The following fifth example allows estimating the amplitude of the detected defect, in order to be able to execute a possible compensatory action.

FIG. 15A shows a top view of a sensor C similar to the one presented in the above FIGS. 12-14. Such a sensor has secondary regions Pa, Pb, Pc and Pd, which are part of the peripheral region P in which are found a certain number of respective photosensitive elements Pa$_i$, Pb$_i$, Pc$_i$ and Pd$_i$, situated on the X or Y axis of symmetry of the central region. In the present example, each secondary region comprises four photosensitive elements, but the invention is not limited to this number. Similarly, it is also possible to define a different number of secondary regions. As an example, solely the secondary regions Pa and Pb could be used.

In a secondary region, such as the region Pa for example, the four photosensitive elements Pa$_i$ are spaced apart from one another by a given distance ε. One can use this distance in all secondary regions, or each region may have its own distance between the photosensitive elements.

The sensor in FIG. 15A is illuminated by a circle of illumination $I_{ref}$ identical to the one in FIG. 11A, meaning it corresponds to the optimum positioning of the optical device L relative to the sensor C in terms of focus and decentering. In the present case, the circle of illumination $I_{ref}$ passes through all secondary regions. For example, in the case of the region Pa, the circle of illumination $I_{ref}$ passes between elements Pa$_2$ and Pa$_3$, which implies that the elements Pa$_1$ and Pa$_2$ are substantially well illuminated while the elements Pa$_3$ and Pa$_4$ are barely or not at all illuminated. One can define a reference quantity Gref$_a$ relative to the region Pa, corresponding to the illumination of the region Pa by a correctly positioned optical device L. Such a quantity can for example be the sum of the intensities received by the photosensitive elements of the region Pa. Here, this sum is equal to the value "2" and reflects the fact that the circle of illumination passes between the elements Pa$_2$ and Pa$_3$. A similar calculation can be made for each of the other secondary regions.

FIG. 15B illustrates the case where the optical device L is off-center relative to the sensor C along the direction of its X axis.

In this case, and when there is no change in the distance between the device L and the sensor C, the circle of illumination $I_5$ having center $O_{I5}$ passes between photosensitive elements Pc$_3$ and Pc$_4$ of the secondary region Pc, as well as between the photosensitive elements Pd$_2$ and Pd$_1$ of the secondary region Pd. The relative quantity $G_d$ of the region Pd will therefore decrease relative to the optimum case and will have the value "1" in the present example, while the relative quantity $G_c$ of the region Pc will increase relative to the optimum case and have the value "3".

The deviations between the relative quantities of the regions Pa-Pd (here having the respective values "2", "2", "3", "1") and the relative reference quantities for these same regions (which all have values of "2" in the present case), provide information on the decentering of the optical device L towards the right of the sensor C as well as its amplitude, with an uncertainty corresponding to the distance $\epsilon$ between the photosensitive elements of the same region. Here one can also verify, by determining the point of passage of the circle of illumination in the different secondary regions, the size of the circle of illumination, and therefore any defocusing. In the present case, the determined deviation allows concluding that the focus distance is not modified.

FIG. 15C illustrates two other cases, this time where the optical device L is defocused relative to the sensor C, with no decentering between the device L and the sensor C.

In the first case, the circle of illumination $I_6$ passes between the first and second photosensitive elements of each secondary region. The quantities G relative to each region will therefore decrease relative to the optimum case and have the value "1" in this example. The comparison of these relative quantities G to the reference relative quantities $Gref_i$, which have the value "2" in this example, will indicate a decrease in the radius of the circle of illumination, and therefore a decrease in the distance separating the sensor C from the optical device L. The fact that the relative quantities for opposing secondary regions decrease simultaneously by the same magnitude means there is no decentering defect.

Knowing the points of passage of the circle of illumination $I_6$ in the secondary regions allows calculating its radius $R_{I6}$ with an uncertainty corresponding to two times the distance $\epsilon$ between two consecutive photosensitive elements in a same secondary region. From this radius, knowing the solid angle of illumination $\Theta$, the distance $F_{I6}$ separating the sensor C and the optical device L can be deduced by the relation $\tan(\Theta) = R_{I6}/F_{I6}$. This provides a measurement of the degree of defocusing of the optical sensor module.

In a second case, the circle of illumination $I_7$ passes between the second and third photosensitive elements of each secondary region. The relative quantities $G_i$ of each region will therefore increase relative to the optimum case and have the value "3" in this example. The comparison of these relative quantities $G_i$ relative to the reference relative quantities $Gref_i$, which still have the value "2" in this example, will indicate an increase in radius of the circle of illumination, and therefore an increase in the distance separating the sensor C from the optical device L. Here again, the fact that the relative quantities of opposing secondary regions increase simultaneously in the same proportions means that there is no decentering defect.

Similarly to the previous case, knowing the points of passage of the circle of illumination $I_7$ in the secondary regions allows calculating its radius $R_{I7}$ with an uncertainty corresponding to two times the distance $\epsilon$ between two consecutive photosensitive elements of a same secondary region. From this radius, and knowing the solid angle of illumination $\Theta$, the distance $F_{I7}$ separating the sensor C from the optical device L can be deduced by the relation $\tan(\Theta) = R_{I7}/F_{I7}$. This provides a measurement of the degree of defocus of the optical sensor module.

In the examples in FIGS. 11A to 15C, each optical defect was presented separately for purposes of simplification. It is obvious, however, that a decentering defect may occur simultaneously with a focusing defect. By its configuration, the optical sensor module presented in FIGS. 15A-15C will be able to detect and estimate each of the defects independently.

The two embodiments were presented separately. It is of course obvious that a system of the invention can combine these two embodiments and simultaneously use the response of certain photosensitive elements dedicated to image capture, such as in FIGS. 6A and 6B, as well as the response of certain photosensitive elements situated in a peripheral region P of the sensor, such as in FIG. 11A or 15A. Such a system then allows detecting, and possibly compensating for, a tilt defect as easily as a decentering defect or a focusing defect in the optical sensor module.

Of course, the invention is not limited to the embodiments described and represented. Other embodiments and other forms can be implemented within the scope of the invention.

In particular, when the monitoring of the image capture system includes estimating an optical defect, for example in order to compensate for it, the defect can be one of the optical defects mentioned above, or any other conceivable optical defect detectable from the respective responses of at least some of the photosensitive elements of the sensor.

The invention claimed is:

1. A method for monitoring an image capture system comprising a sensor comprising a plurality of photosensitive elements and an optical device for focusing the light emitted from a scene towards the sensor, said method comprising the following steps:
/1/ obtaining respective responses from at least some of the photosensitive elements of the sensor to an exposure of the image capture system to any scene, said respective responses comprising the responses from a plurality of pairs of photosensitive elements,
/2/ determining, for at least one of said pairs of photosensitive elements, at least one deviation between at least one quantity deduced from the responses obtained of the photosensitive elements which are part of said pair and at least one reference quantity, and
/3/ estimating an optical defect of the image capture system from said determined deviation.

2. A method according to claim 1, additionally comprising the following step:
/4/ applying an action suitable for compensating at least partially for the estimated optical defect.

3. A method according to claim 1, wherein the obtained responses comprise the responses from photosensitive elements sensitive to at least one common spectral band.

4. A method according to claim 3, wherein the obtained responses comprise the responses of photosensitive elements sensitive to at least the green spectral band.

5. A method according to claim 1, wherein the quantity deduced from the obtained responses comprises a mathematical comparison between at least some of said obtained responses.

6. A method according to claim 1, wherein at least some of the photosensitive elements from which the respective responses are obtained are first- or second-nearest neighbors in the sensor.

7. A method according to claim 1, wherein said plurality of pairs of photosensitive elements is positioned in a selected region of the sensor.

8. A method for monitoring an image capture system comprising a sensor comprising a plurality of photosensitive elements and an optical device for focusing the light emitted from a scene towards the sensor, said method comprising the following steps:

/1/ obtaining respective responses from at least some of the photosensitive elements of the sensor to an exposure of the image capture system to any scene, said respective responses comprising the responses from a plurality of pairs of photosensitive elements, and /2/ determining, for at least one of said pairs of photosensitive elements, at least one deviation between at least one quantity deduced from the responses obtained of the photosensitive elements which are part of said pair and at least one reference quantity, wherein the obtained responses comprise the responses of photosensitive elements situated at the periphery of the sensor.

9. A method according to claim 8, wherein the sensor comprises a central region for capturing images and a peripheral region that does not participate in the image capture, and wherein said photosensitive elements situated at the periphery of the sensor are part of said peripheral region.

10. A method according to claim 9, wherein the obtained responses comprise the responses from at least a first plurality of photosensitive elements positioned on a first axis passing through the central image capture region and part of a first secondary region of the sensor, separated from each other by a determined distance, and a second plurality of photosensitive elements positioned on a second axis passing through the central image capture region and substantially orthogonal to said first axis, being part of a second secondary region of the sensor distinct from said first secondary region and separated from each other by a determined distance.

11. A method according to claim 8, wherein the obtained responses comprise the responses from at least two photosensitive elements positioned on a first axis passing through the central image capture region, on each side of said central region.

12. A method according to claim 11, wherein the obtained responses additionally comprise the responses from at least two other photosensitive elements positioned on a second axis passing through the central image capture region and substantially orthogonal to said first axis, one on each side of said central region.

13. An image capture system for implementing the method according to claim 1, comprising:

a means for determining the at least one deviation between the at least one quantity deduced from the pair of respective responses from at least two of the photosensitive elements of the sensor to an exposure of the image capture system to any scene, and the at least one reference quantity, and a means of estimating the optical defect in the image capture system based on said determined deviation.

14. An image capture system according to claim 13, additionally comprising a means of at least partially compensating for the estimated optical defect.

15. A digital camera comprising an image capture system according to claim 13.

* * * * *